(12) United States Patent
Farrand et al.

(10) Patent No.: US 9,152,006 B2
(45) Date of Patent: Oct. 6, 2015

(54) PARTICLES FOR ELECTROPHORETIC DISPLAYS

(71) Applicant: Merck Patent GmbH, Darmstadt (DE)

(72) Inventors: Louise Diane Farrand, Dorset (GB); Claire Topping, Southampton (GB); Anthony Lawrence, Manchester (GB)

(73) Assignee: Merck Patent GmbH, Darmstadt (DE)

( * ) Notice: Subject to any disclaimer, the term of this patent is extended or adjusted under 35 U.S.C. 154(b) by 0 days.

(21) Appl. No.: 14/361,420

(22) PCT Filed: Nov. 2, 2012

(86) PCT No.: PCT/EP2012/004585
§ 371 (c)(1),
(2) Date: May 29, 2014

(87) PCT Pub. No.: WO2013/079146
PCT Pub. Date: Jun. 6, 2013

(65) Prior Publication Data
US 2014/0320951 A1 Oct. 30, 2014

(30) Foreign Application Priority Data
Nov. 30, 2011 (EP) .................. 11009486

(51) Int. Cl.
G02B 26/00 (2006.01)
G01F 1/64 (2006.01)
G03G 17/04 (2006.01)
G02F 1/167 (2006.01)
C09B 31/043 (2006.01)
C09B 69/10 (2006.01)
G02F 1/1343 (2006.01)

(52) U.S. Cl.
CPC .............. G02F 1/167 (2013.01); C09B 31/043 (2013.01); C09B 69/106 (2013.01); G02F 1/13439 (2013.01); G02F 2001/1678 (2013.01); Y10T 428/2982 (2015.01)

(58) Field of Classification Search
CPC ........... G02F 1/167; G02F 2001/1678; G02F 1/13439
USPC ........ 359/296; 204/450, 536, 632; 428/32.25, 428/402, 407; 430/32, 38
See application file for complete search history.

(56) References Cited

U.S. PATENT DOCUMENTS

| | | | |
|---|---|---|---|
| 4,322,487 A * | 3/1982 | Merrill et al. ................... | 430/37 |
| 5,284,922 A | 2/1994 | Amano et al. | |
| 5,380,362 A | 1/1995 | Schubert | |
| 5,403,518 A | 4/1995 | Schubert | |
| 5,783,614 A | 7/1998 | Chen et al. | |
| 6,194,488 B1 | 2/2001 | Chen et al. | |
| 6,956,690 B2 | 10/2005 | Yu et al. | |
| 7,038,655 B2 | 5/2006 | Herb et al. | |
| 7,052,766 B2 | 5/2006 | Zang et al. | |
| 7,110,162 B2 | 9/2006 | Wu et al. | |
| 7,170,670 B2 | 1/2007 | Webber | |
| 7,226,550 B2 | 6/2007 | Hou et al. | |
| 7,236,290 B1 | 6/2007 | Zhang et al. | |
| 7,247,379 B2 | 7/2007 | Pullen et al. | |
| 7,277,218 B2 | 10/2007 | Hwang et al. | |
| 7,304,634 B2 | 12/2007 | Albert et al. | |
| 2002/0180688 A1 | 12/2002 | Drzaic et al. | |
| 2005/0000813 A1 | 1/2005 | Pullen et al. | |
| 2005/0270628 A1 * | 12/2005 | Miyazaki et al. ............. | 359/296 |
| 2007/0128352 A1 | 6/2007 | Honeyman et al. | |
| 2007/0268244 A1 | 11/2007 | Chopra et al. | |
| 2008/0038669 A1 * | 2/2008 | Kakino ......................... | 430/302 |
| 2011/0216392 A1 * | 9/2011 | Baisch et al. ................. | 359/296 |

FOREIGN PATENT DOCUMENTS

| | | |
|---|---|---|
| GB | 1234072 A | 6/1971 |
| GB | 1261350 A | 1/1972 |
| GB | 1262092 A | 2/1972 |
| GB | 2040978 A | 9/1980 |
| GB | 2438436 A | 11/2007 |
| JP | 59187061 A | 10/1984 |
| JP | 61004764 A | 1/1986 |
| WO | WO-95/02848 A1 | 1/1995 |
| WO | WO-99/10767 A1 | 3/1999 |
| WO | WO-2004/023195 A2 | 3/2004 |
| WO | WO-2005/017046 A2 | 2/2005 |
| WO | WO-2007/053012 A1 | 5/2007 |
| WO | WO-2008/055846 A1 | 5/2008 |
| WO | WO-2010/089057 A2 | 8/2010 |
| WO | WO-2010/089058 A1 | 8/2010 |
| WO | WO-2010/089059 A1 | 8/2010 |
| WO | WO-2010/089060 A2 | 8/2010 |
| WO | WO-2012/019704 A1 | 2/2012 |
| WO | WO-2013/079158 A1 | 6/2013 |

OTHER PUBLICATIONS

Hernandez et al., "Novel Diacetylene- and Chromophore-Containing Polymers and their Secord Order Nonlinear Optical Properties", Mol. Cryst. Liq. Cryst., vol. 374, pp. 503-512 (2002).
International Search Report for PCT/EP2012/004707 dated Jan. 2, 2013.
International Search Report for PCT/EP2012/004585 mailed Mar. 21, 2013.
International Preliminary Report on Patentability for for PCT/EP2012/004585 issued Jun. 3, 2014.

* cited by examiner

Primary Examiner — Evelyn A Lester
(74) Attorney, Agent, or Firm — Drinker Biddle & reath LLP

(57) ABSTRACT

This invention relates to polymer particles, a process for their preparation, the use of these particles for the preparation of an electrophoretic device, electrophoretic displays comprising such particle, and new polymerisable dyes.

18 Claims, No Drawings

PARTICLES FOR ELECTROPHORETIC DISPLAYS

CROSS-REFERENCE TO RELATED APPLICATIONS

This is a national stage application (under 35 U.S.C. §371) of PCT/EP2012/004585, filed Nov. 2, 2012, which claims benefit of European Application No. 11009486.9, filed Nov. 30, 2011, both of which arer incorporated herein by reference in their entirety.

This invention relates to polymer particles, a process for their preparation, the use of these particles for the preparation of an electrophoretic device, electrophoretic displays comprising such particles, and new polymerisable dyes.

In recent years a need has developed for low power, low cost and light weight display devices. EPDs (Electrophoretic Displays) can fulfil this requirement. One use of EPDs is for electronic paper. It is imperative that once an image is displayed, the image can be retained for a long period of time without further voltage being applied. Hence, this fulfils the requirements of low power use, and means an image can be visible until another image is required.

An EPD generally comprises charged electrophoretic particles dispersed between two substrates, each comprising one or more electrodes. The space between the electrodes is filled with a dispersion medium which is a different colour from the colour of the particles. If a voltage is applied between the electrodes, charged particles move to the electrode of opposite polarity. The particles can cover the observer's side electrode, so that a colour identical to the colour of the particles is displayed when an image is observed from the observer's side. Any image can be observed using a multiplicity of pixels.

Available technologies of EPDs include electronic paper, commercially used in electronic books. This application uses black and white colour. The use of different coloured particles in a single pixel has been exemplified in recent patent literature (U.S. Pat. No. 7,304,634, GB 2 438 436, US 2007/0268244). WO 2010/089057, WO 2010/089058, WO 2010/089059 and WO 2010/089060 describe coloured polymer particles for EPD. Polymerisable dyes for use in ophthalmic lens materials are known from WO 2007/053012; polymerisable dyes for colouration of polymeric films are described in WO 95/02848; GB 1262092; GB 1261350; GB 1234072.

Previously reported methods of preparing black particles include the use of encapsulated inorganic pigments such as copper chromite (US 2005/0000813), but this has a high density, therefore it is more difficult to control settling of particles. Carbon black has also been used because it is readily available; again this has problems because it can absorb gases and liquids, and can also cause charging issues in a dual particle electrophoretic display (see U.S. Pat. No. 7,247,379).

There is a need for new particles, especially black particles which can be easily dispersed in non-polar media, show electrophoretic mobility and which do not leach dye in a dispersant Therefore, the object of this invention is to provide such particles for use in electro-optically active media for electrophoretic displays.

This object is solved by polymer particles for use in electrophoretic devices comprising monomer units of a) at least one polymerisable dye, b) at least one monomer, c) optionally at least one charged co-monomer, and d) optionally at least one crosslinking co-monomer, by a process for the preparation of such polymer particles, by the use of these particles for the preparation of an electrophoretic device, by electrophoretic fluids and devices comprising such particles, and by polymerisable dyes; wherein dyes according to claim 1 are used. In particular, the present invention concerns black polymer particles, their preparation and use, and corresponding polymerisable dyes.

This invention specifically relates to polymeric particles preferably with surface functionality for charge retention. The particles can be easily dispersed in non-polar media, show electrophoretic mobility and they do not leach dye in a dispersant Therefore, the particles are explicitly useful for electrophoretic fluids and displays.

Polymeric sub-micron sized particles suitable for use in EPD are prepared in a simple 1-step reaction using novel polymerisable dyes with at least one polymerisable group. To provide the best possible colour fastness, the dye properties are chosen for the dye to both react with other monomers and to be preferentially soluble in the particle. Especially the use of a polymerisable dye with more than one polymerisable group enables the dye to become irreversibly chemically bound and well entangled in the polymer particle, thus avoiding any leaching into the EPD solvent. It reduces the amount of any solvent soluble unreacted dye and dye oligomers formed. Hence the dye is more likely to be polymerised into the forming particle than if just one polymerisable group is used, hence avoiding extensive washing to remove any unreacted dye and oligomers from the particles which could also leach from the particles over time. These polymerisable dyes are incorporated throughout the particles and not just at the shell giving a greater loading of dye into the particle. The particles are less likely to suffer from photo or oxidation degradation.

The present invention advantageously provides a simple preparation of polymer particles, especially black polymer particles, without additional steps, a dye/dyes which does/do not leach into the EPD fluid, the ability to achieve and easily adjust required shade. Particle size can be controlled, and mono-disperse particles can be prepared. The particles are prepared in a solvent suitable for EPD and do not require expensive freeze drying steps. Particles with a low density can be prepared to help avoid settling issues. Another advantage is the reduction of the amount of unreacted dye and therefore reduction of the amount of cleaning steps such as centrifugation followed by decantation. It is also possible to increase the loading of dye in a particle to achieve the desired depth of black. A further advantage is that the properties of the dye can be tailored to the particles so that the dye does not adversely affect the formation or properties of the particles.

Essential components of the polymer particles according to the invention are polymerisable dyes of Formula (1)

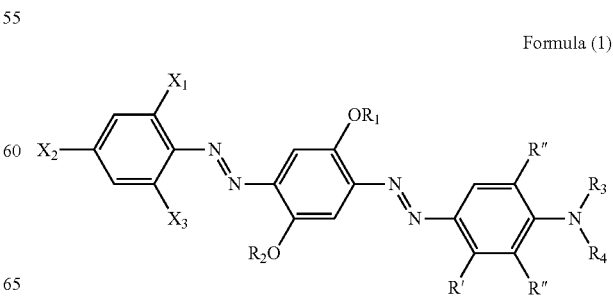

Formula (1)

Wherein $X_1$, $X_2$, and $X_3$ are independently of one another H or an electron-withdrawing group;

$R_1$ and $R_2$ are independently of one another groups of the structure $L_1$-$Y_1$, $L_2$-$Y_2$ or linear, branched or cyclic alkyl groups;

$R_3$ and $R_4$ are independently of one another groups of the structure $L_3$-$Y_3$, $L_4$-$Y_4$ or linear, branched or cyclic, substituted or unsubstituted alkyl groups where one or more non-adjacent carbon atoms may be replaced by O, S and/or N, preferably O;

$L_1$, $L_2$, $L_3$, and $L_4$ are linker groups and independently of one another linear or branched, substituted or unsubstituted alkylene groups where one or more non-adjacent carbon atoms may be replaced by O, S and/or N, preferably O;

$Y_1$, $Y_2$, $Y_3$, and $Y_4$ are independently of one another polymerisable groups;

R' is a linear or branched alkyl group, $OR_5$, H, $NHCOR_5$ or $NHSO_2R_7$;

R" is $OR_5$, H or $NHCOR_5$, $R_5$, $R_6$, and $R_7$ are independently of one another linear or branched alkyl groups; and Wherein at least one of $R_1$, $R_2$, $R_3$ and $R_4$ is a polymerisable group and at least one of $X_1$, $X_2$, and $X_3$ is an electron-withdrawing group.

Preferably black polymerisable dyes of Formula (1) are used to prepare black polymer particles for use in electrophoretic devices. Preferably one black polymerisable dye is used. However, at least two polymerisable dyes of Formula (1) may be used for the preparation of black polymer particles. In a variant of the invention, at least one of the polymerisable dyes of Formula (1) is used in combination with at least one other polymerisable dye, e.g. those described in WO 2010/089057 and in WO 2012/019704. Such combinations may be especially useful for the preparation of polymer particles which are of a neutral black colour. Optionally yellow polymerisable dyes like Dye A and Dye B or cyan polymerisable dyes like Dye C or magenta polymerisable dyes like Dye D may be used in combination with dyes of Formula (1).

Dye A

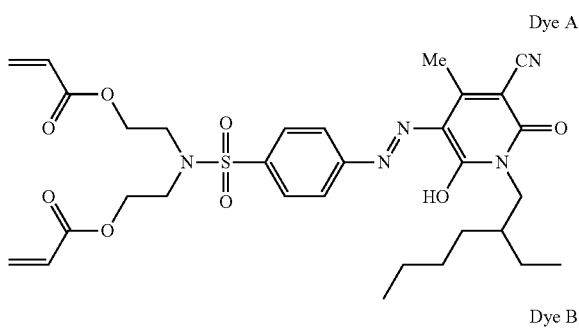

Dye B

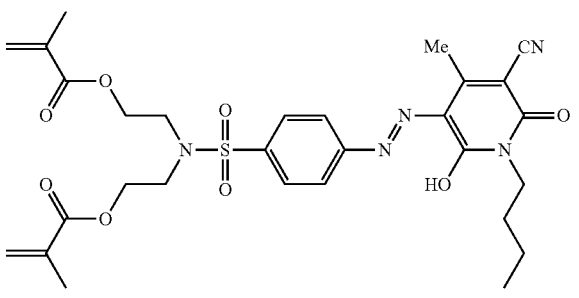

Dye C

CuPc $\begin{matrix} [3/6\text{-}SO_2-N(n\text{-}C_4H_9)C_2H_4O-CO-C(Me)=CH_2]_2 \\ [3/6\text{-}SO_2-N\{CH_2CH(Et)n\text{-}C_4H_9\}_2]_2 \end{matrix}$ Dye D

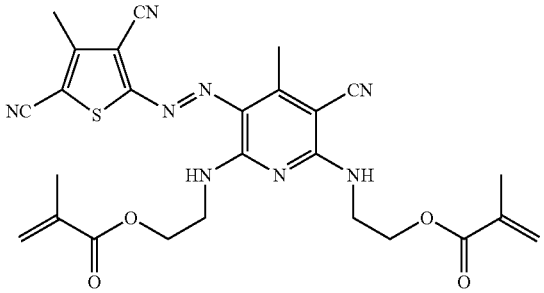

The term "electron-withdrawing group" is well known in the art and refers to the tendency of a substituent to attract valence electrons from neighbouring atoms; in other words the substituent is electronegative with respect to neighbouring atoms. Examples of electron-withdrawing groups include $NO_2$, CN, halogen, acyl, trifluoromethoxy, trifluoromethyl, $SO_2F$, and $CO_2R$, $SO_2R$, $SO_2NRR$ or $SO_2NHR$, with R being independently linear or branched alkyl, preferably C1-C4 alkyl. Preferably, at least one of $X_1$, $X_2$, and $X_3$ is $NO_2$, CN, Br, Cl, $SO_2NRR$ or $SO_2NHR$. Especially preferred are polymerisable dyes with $X_2$ and one of $X_1$ and $X_3$ being $NO_2$, CN, Br, Cl, $SO_2NRR$ or $SO_2NHR$, preferably with R=methyl. Also preferred are polymerisable dyes with $X_2$ being $NO_2$, CN, Br, Cl, $SO_2NRR$ or $SO_2NHR$, preferably with R=methyl, and $X_1$ and $X_3$ being H.

The polymerisable groups $Y_1$, $Y_2$, $Y_3$, and $Y_4$ may be selected from e.g. methacrylate, acrylate, methacrylamide, acrylamide, oxetanes, vinyl, vinyloxy, epoxy, allyl, propenyl ether, styryl groups, in particular methacrylate, acrylate, methacrylamide, and acrylamide. Preferably, groups $Y_1$, $Y_2$, $Y_3$, and $Y_4$ are selected from methacrylate and acrylate.

In case that $R_1$ and $R_2$ are independently of one another linear, branched or cyclic alkyl groups, $R_1$ and $R_2$ are preferably C1-C20 alkyl groups, especially alkyl groups having 1 to 10 carbon atoms. C2-C8 alkyl groups are even more preferred.

If $R_1$ and $R_2$ are independently of one another groups of the structure $L_1$-$Y_1$ or $L_2$-$Y_2$, preferably $L_1$ and $L_2$ are independently of one another linear or branched C1-C20 alkylene groups, especially alkylene groups having 1 to 10 carbon atoms. Linear C2-C6 alkylen groups are even more preferred.

Especially groups where $Y_1$ and $Y_2$ are methacrylate or acrylate are preferred. Especially groups $Y_1$ and $Y_2$ are identical.

In case that $R_3$ and $R_4$ are independently of one another linear, branched or cyclic alkyl groups, $R_3$ and $R_4$ are preferably C1-C20 alkyl groups, especially alkyl groups having 1 to 10 carbon atoms. C2-C8 alkyl groups are even more preferred.

If $R_3$ and $R_4$ are independently of one another groups of the structure $L_3$-$Y_3$ or $L_4$-$Y_4$, preferably $L_3$ and $L_4$ are independently of one another linear or branched C1-C20 alkylene groups, especially alkylene groups having 1 to 10 carbon atoms. Linear C2-C6 alkylene groups are even more preferred.

Especially groups where $Y_3$ and $Y_4$ are methacrylate or acrylate are preferred. Especially groups $Y_3$ and $Y_4$ are identical.

Preferably, R' is a linear or branched C1-C4 alkyl group or $ORS$, H, $NHCOR_6$ or $NHSO_2R_7$ with $R_5$, $R_6$, and $R_7$ preferably independently of one another linear or branched C1-C4 alkyl groups. It is especially preferred to use polymerisable dyes with R'=CH$_3$ or OCH$_3$.

Preferably, polymerisable dyes with R"=H are used.

Preferred polymerisable dyes are in particular those dyes in which all variables have the preferred meanings.

In a preferred group of polymerisable dyes of the Formula (1), $R_1$ and $R_2$ stand for linear, branched or cyclic alkyl groups and $R_3$ and $R_4$ stand for the structures $L_3$-$Y_3$ or $L_4$-$Y_4$. Particularly preferred are polymerisable dyes where $R_1$ and $R_2$ as well as $R_3$ and $R_4$ are identical. Particular preference is given to polymerisable dyes in which both $R_1$ and $R_2$ and also $R_3$ and $R_4$ have the preferred meanings, especially in combination with the preferred groups of $X_1$, $X_2$, and $X_3$ and R' and R".

In another preferred group of polymerisable dyes of the Formula (1), $R_3$ and $R_4$ stand for linear, branched or cyclic alkyl groups and $R_1$ and $R_2$ stand for the structures $L_1$-$Y_1$ or $L_2$-$Y_2$. Particularly preferred are polymerisable dyes where $R_3$ and $R_4$ as well as $R_1$ and $R_2$ are identical. Particular preference is given to polymerisable dyes in which both $R_1$ and $R_2$ and also $R_3$ and $R_4$ have the preferred meanings, especially in combination with the preferred groups of $X_1$, $X_2$, and $X_3$ and R' and R".

Particular preference is given to polymerisable dyes according to Formulas (2) to (5):

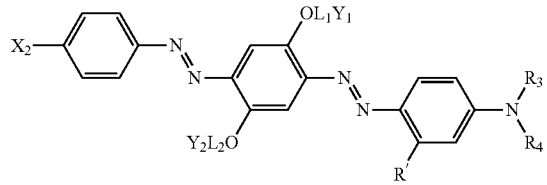

Formula (2)

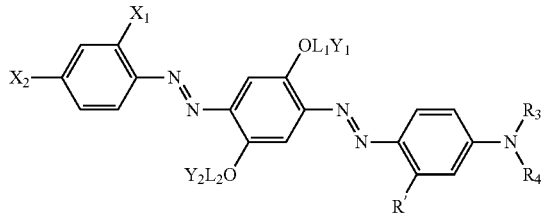

Formula (3)

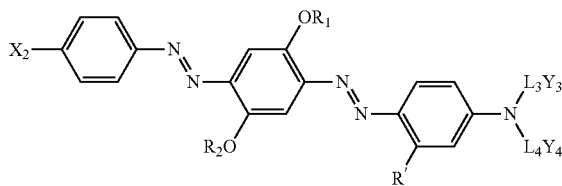

Formula (4)

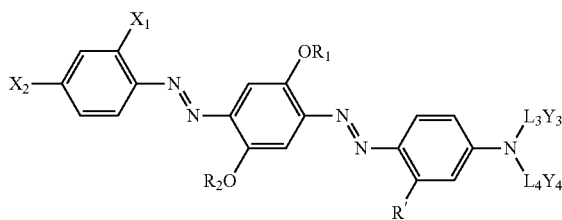

Formula (5)

Wherein
$X_1$ stands for NO$_2$ or CN;
$X_2$ stands for NO$_2$, CN or halogen;
$L_1$, $L_2$, $L_3$, and $L_4$ stand for C2-C10 alkylene;
$Y_1$, $Y_2$, $Y_3$, and $Y_4$ stand for methacrylate or acrylate;
$R_1$, $R_2$, $R_3$, and $R_4$ stand for C2-C10 alkyl, and
R' stands for CH$_3$ or OCH$_3$. Examples of preferred polymerisable dyes of Formulas (2) to (5) are listed in Table 1. Particularly preferred are Dye 1, Dye 2, and Dye 3.

TABLE 1

Dye 1

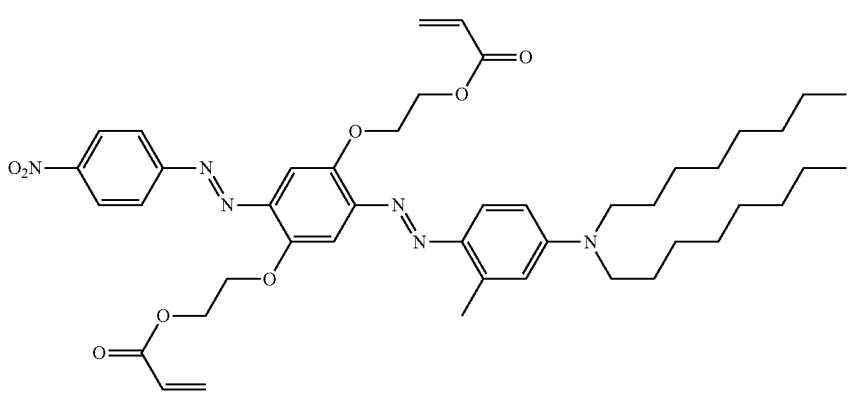 [SMILES: C=CC(=O)OCCOc1cc(/N=N/c2ccc(N(CCCCCCCC)CCCCCCCC)cc2C)c(OCCOC(=O)C=C)cc1/N=N/c1ccc([N+](=O)[O-])cc1]

TABLE 1-continued
Dye 2
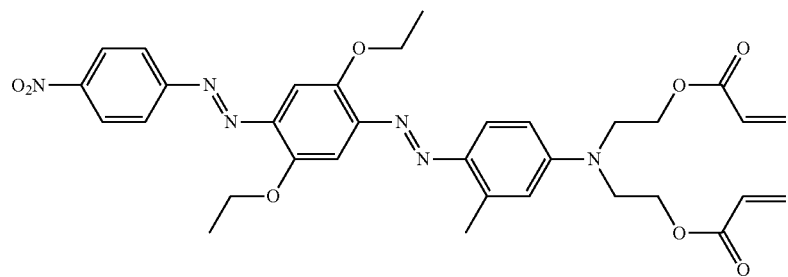 [SMILES: C=CC(=O)OCCN(CCOC(=O)C=C)c1ccc(/N=N/c2cc(OCC)c(/N=N/c3ccc([N+](=O)[O-])cc3)cc2OCC)c(C)c1]
Dye 3
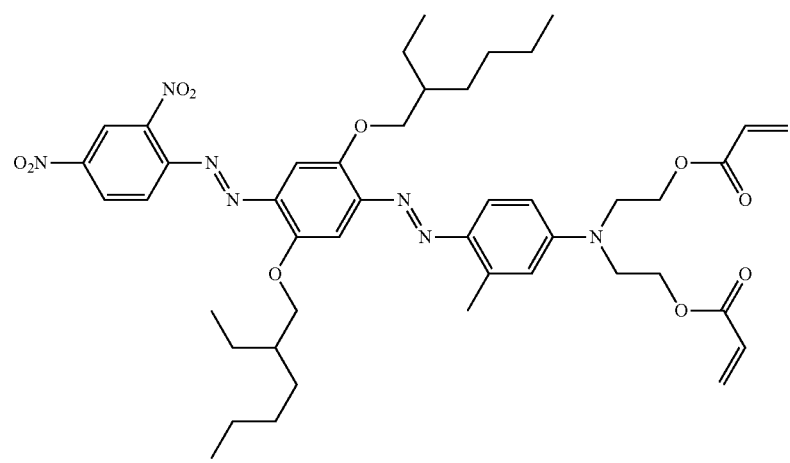 [SMILES: C=CC(=O)OCCN(CCOC(=O)C=C)c1ccc(/N=N/c2cc(OCC(CC)CCCC)c(/N=N/c3ccc([N+](=O)[O-])cc3[N+](=O)[O-])cc2OCC(CC)CCCC)c(C)c1]
Dye 4
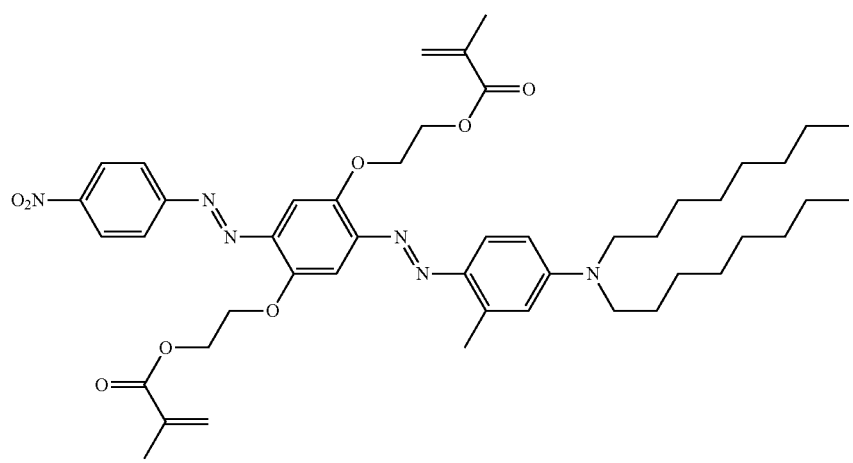 [SMILES: C=C(C)C(=O)OCCOc1cc(/N=N/c2ccc(N(CCCCCCCC)CCCCCCCC)cc2C)c(OCCOC(=O)C(=C)C)cc1/N=N/c1ccc([N+](=O)[O-])cc1]
Dye 5
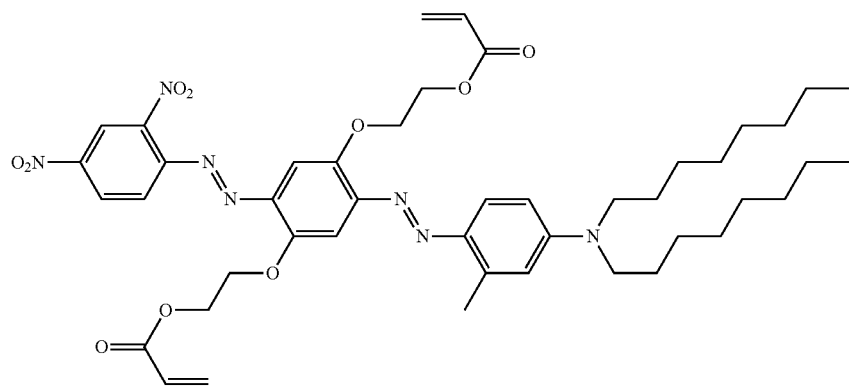 [SMILES: C=CC(=O)OCCOc1cc(/N=N/c2ccc([N+](=O)[O-])cc2[N+](=O)[O-])c(OCCOC(=O)C=C)cc1/N=N/c1ccc(N(CCCCCCCC)CCCCCCCC)cc1C]

TABLE 1-continued
Dye 6
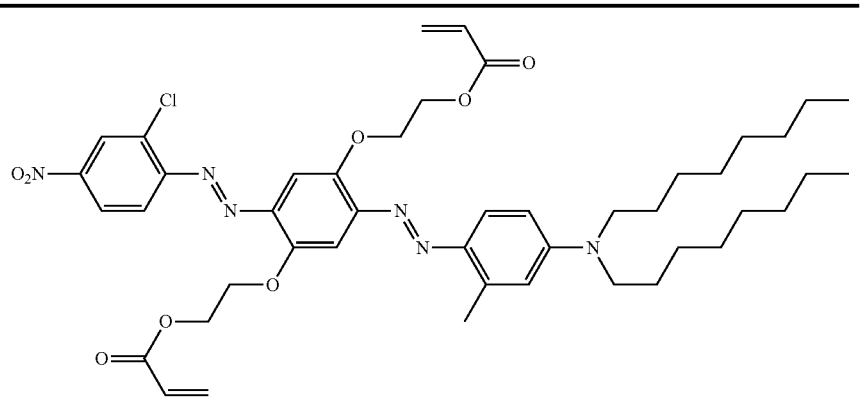
Dye 7
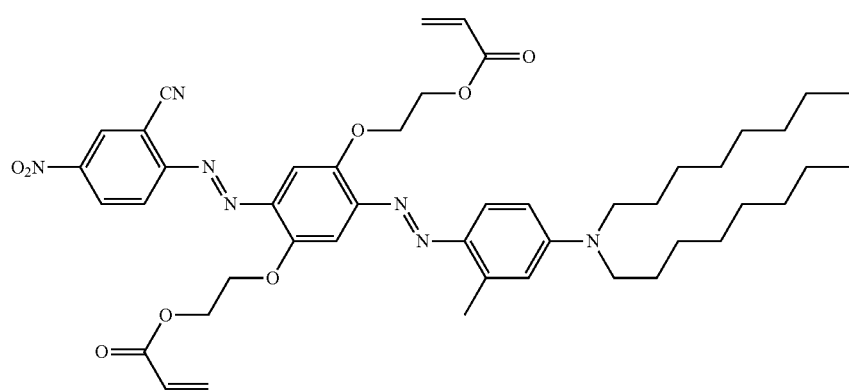 [SMILES: C=CC(=O)OCCOc1cc(/N=N/c2ccc([N+](=O)[O-])cc2C#N)c(OCCOC(=O)C=C)cc1/N=N/c1ccc(N(CCCCCCCC)CCCCCCCC)cc1C]
Dye 8
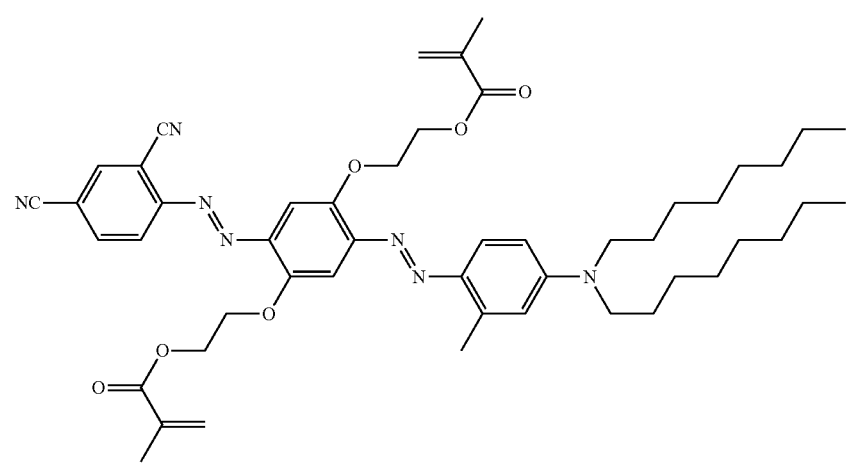 [SMILES: C=C(C)C(=O)OCCOc1cc(/N=N/c2ccc(C#N)cc2C#N)c(OCCOC(=O)C(=C)C)cc1/N=N/c1ccc(N(CCCCCCCC)CCCCCCCC)cc1C]
Dye 9
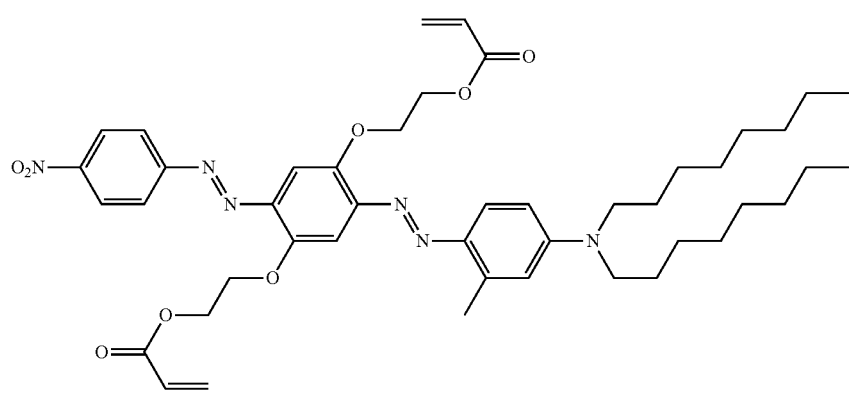 [SMILES: C=CC(=O)OCCOc1cc(/N=N/c2ccc(N(CCCCCCCC)CCCCCCCC)cc2C)c(OCCOC(=O)C=C)cc1/N=N/c1ccc([N+](=O)[O-])cc1]

TABLE 1-continued
Dye 10
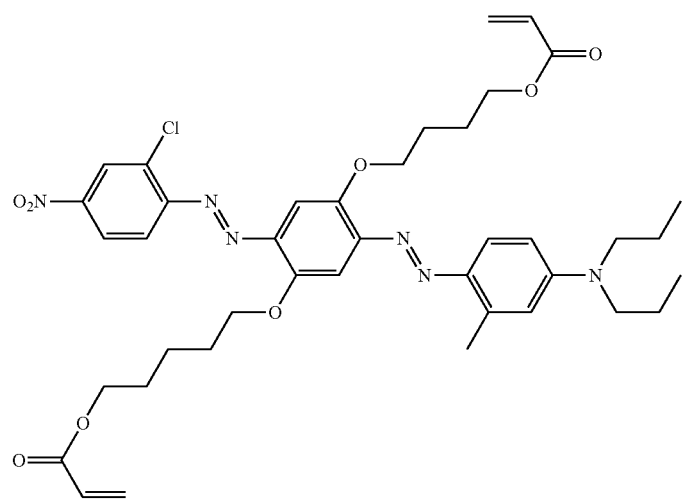 [SMILES: C=CC(=O)OCCCCCOc1cc(/N=N/c2ccc(N(CCC)CCC)cc2C)c(OCCCCOC(=O)C=C)cc1/N=N/c1ccc([N+](=O)[O-])cc1Cl]
Dye 11
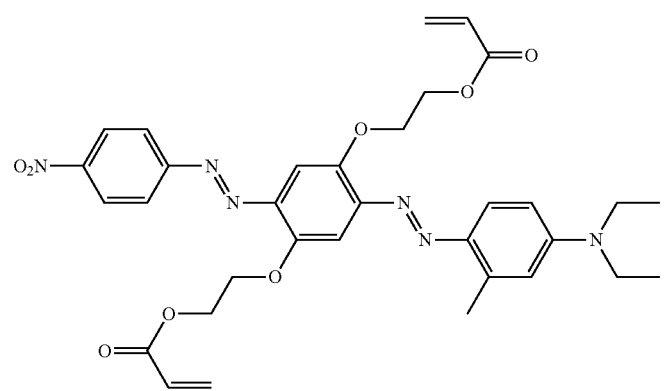 [SMILES: C=CC(=O)OCCOc1cc(/N=N/c2ccc(N(CC)CC)cc2C)c(OCCOC(=O)C=C)cc1/N=N/c1ccc([N+](=O)[O-])cc1]
Dye 12
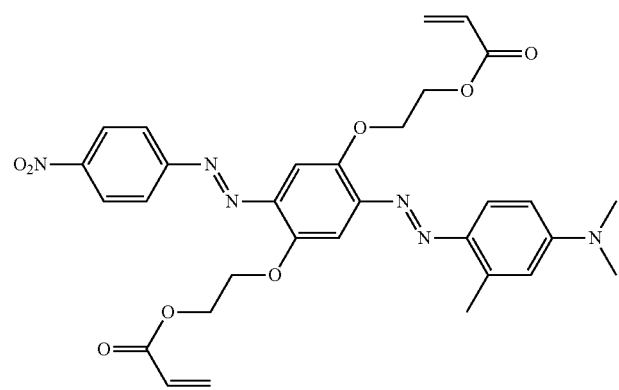 [SMILES: C=CC(=O)OCCOc1cc(/N=N/c2ccc(N(C)C)cc2C)c(OCCOC(=O)C=C)cc1/N=N/c1ccc([N+](=O)[O-])cc1]

TABLE 1-continued
Dye 13
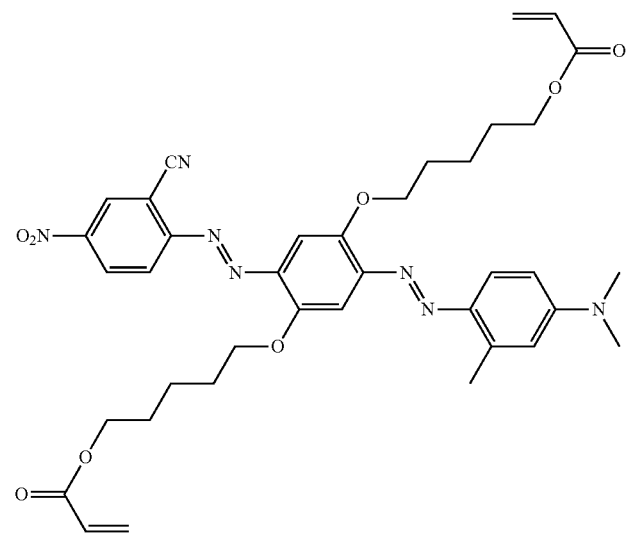 [SMILES: C=CC(=O)OCCCCCOc1cc(/N=N/c2ccc([N+](=O)[O-])cc2C#N)c(OCCCCCOC(=O)C=C)cc1/N=N/c1ccc(N(C)C)cc1C]
Dye 14
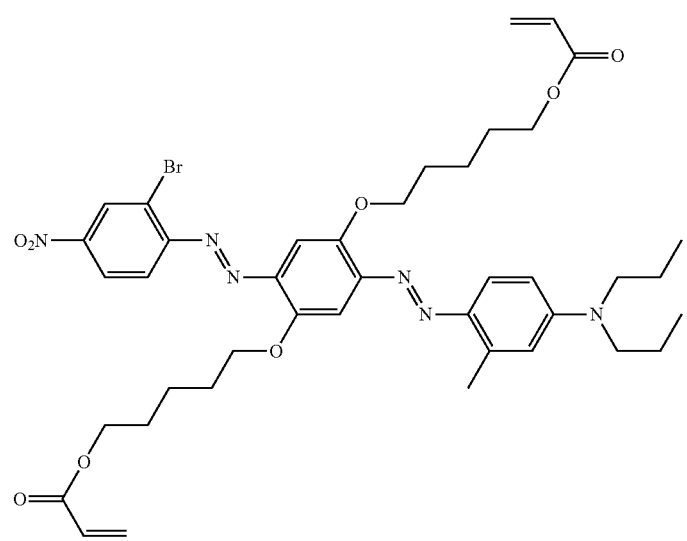 [SMILES: C=CC(=O)OCCCCCOc1cc(/N=N/c2ccc([N+](=O)[O-])cc2Br)c(OCCCCCOC(=O)C=C)cc1/N=N/c1ccc(N(CCC)CCC)cc1C]
Dye 15
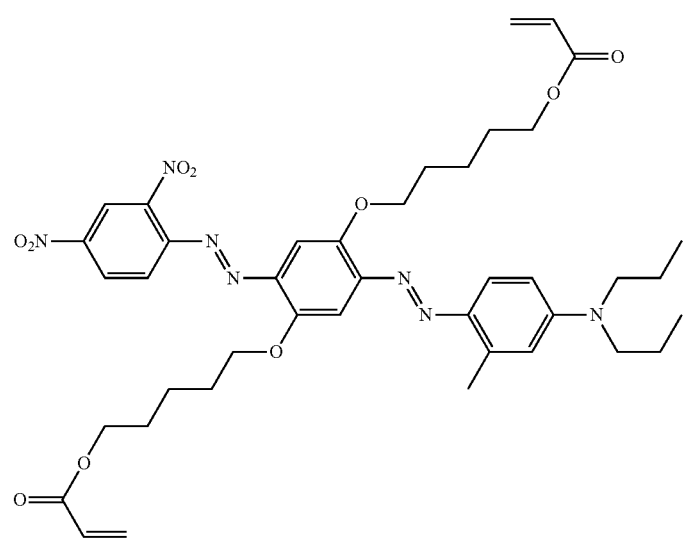 [SMILES: C=CC(=O)OCCCCCOc1cc(/N=N/c2ccc([N+](=O)[O-])cc2[N+](=O)[O-])c(OCCCCCOC(=O)C=C)cc1/N=N/c1ccc(N(CCC)CCC)cc1C]

TABLE 1-continued
Dye 16
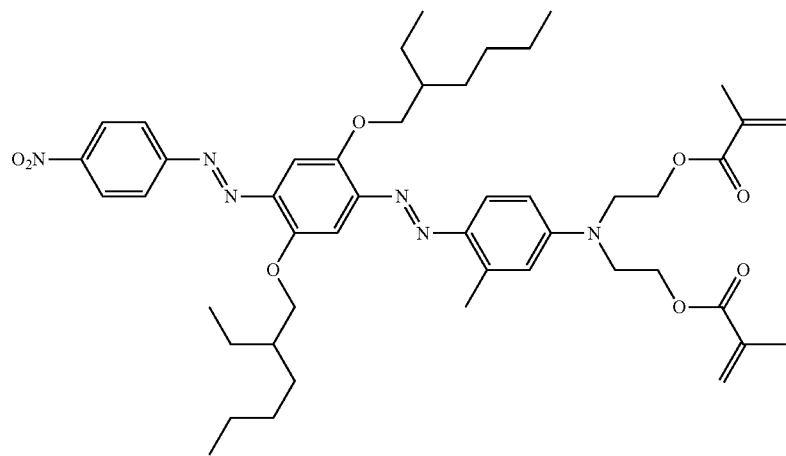 [SMILES: C=C(C)C(=O)OCCN(CCOC(=O)C(=C)C)c1ccc(/N=N/c2cc(OCC(CC)CCCC)c(/N=N/c3ccc([N+](=O)[O-])cc3)cc2OCC(CC)CCCC)c(C)c1]
Dye 17
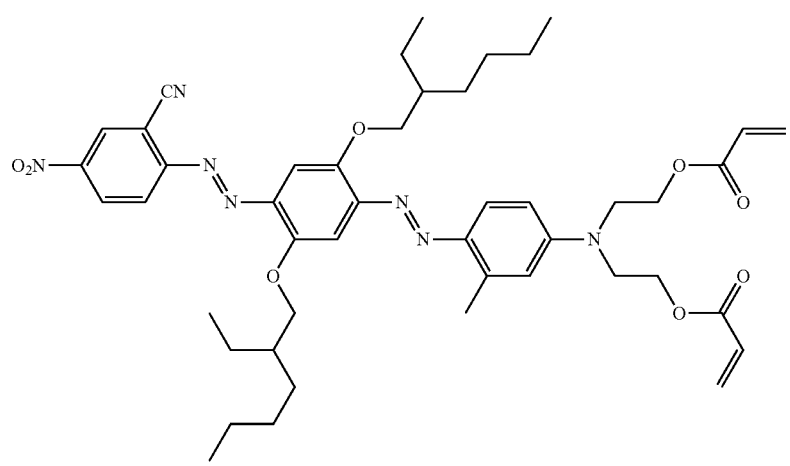 [SMILES: C=CC(=O)OCCN(CCOC(=O)C=C)c1ccc(/N=N/c2cc(OCC(CC)CCCC)c(/N=N/c3ccc([N+](=O)[O-])cc3C#N)cc2OCC(CC)CCCC)c(C)c1]
Dye 18
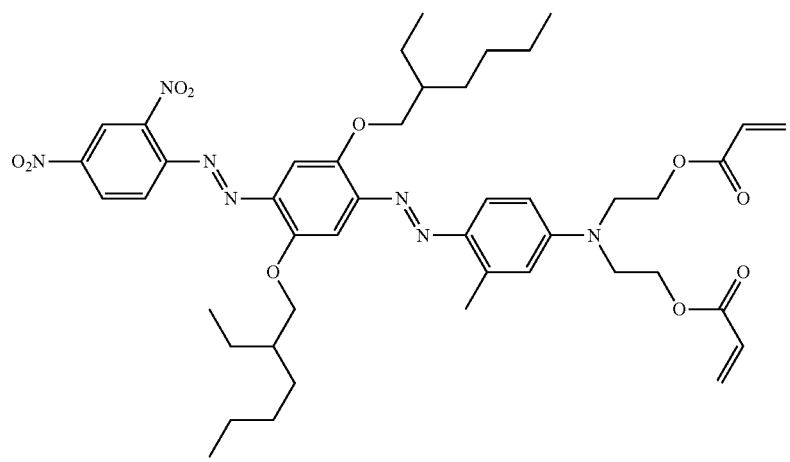 [SMILES: C=CC(=O)OCCN(CCOC(=O)C=C)c1ccc(/N=N/c2cc(OCC(CC)CCCC)c(/N=N/c3ccc([N+](=O)[O-])cc3[N+](=O)[O-])cc2OCC(CC)CCCC)c(C)c1]

TABLE 1-continued
Dye 19
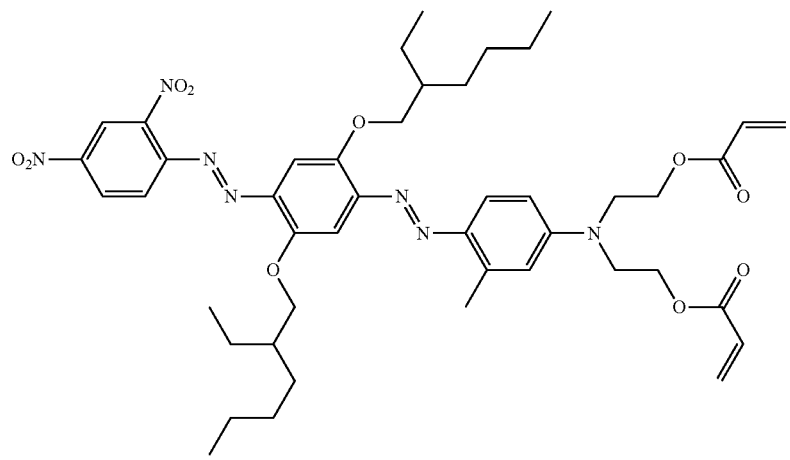 [SMILES: C=CC(=O)OCCN(CCOC(=O)C=C)c1ccc(/N=N/c2cc(OCC(CC)CCCC)c(/N=N/c3ccc([N+](=O)[O-])cc3[N+](=O)[O-])cc2OCC(CC)CCCC)c(C)c1]
Dye 20
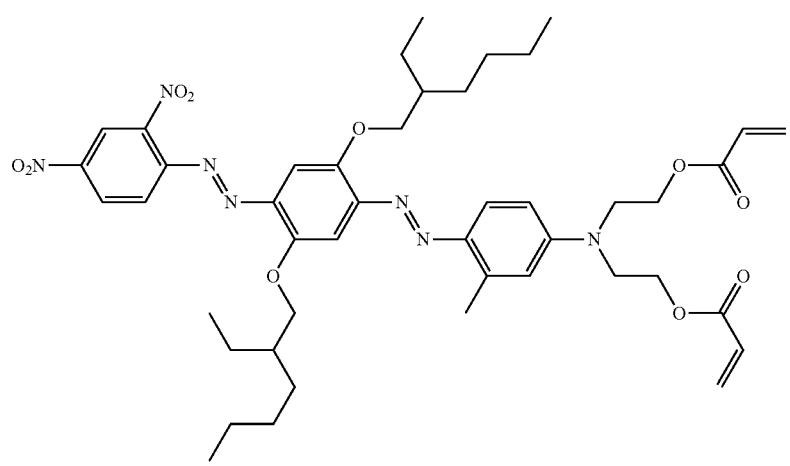 [SMILES: C=CC(=O)OCCN(CCOC(=O)C=C)c1ccc(/N=N/c2cc(OCC(CC)CCCC)c(/N=N/c3ccc([N+](=O)[O-])cc3[N+](=O)[O-])cc2OCC(CC)CCCC)c(C)c1]
Dye 21
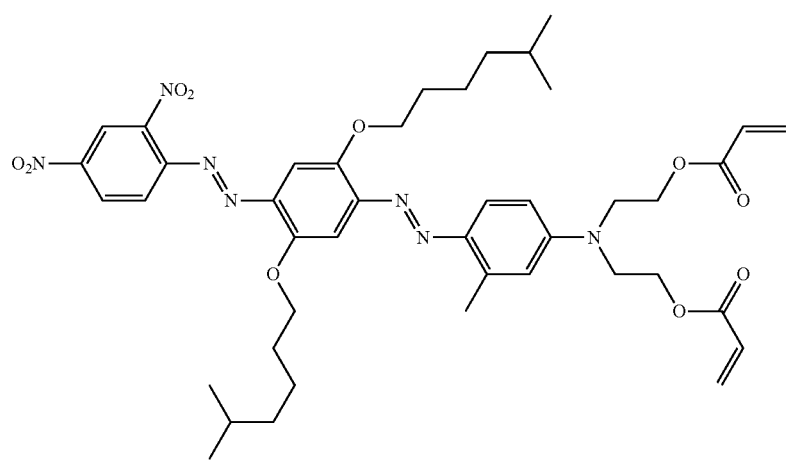 [SMILES: C=CC(=O)OCCN(CCOC(=O)C=C)c1ccc(/N=N/c2cc(OCCCCC(C)C)c(/N=N/c3ccc([N+](=O)[O-])cc3[N+](=O)[O-])cc2OCCCCC(C)C)c(C)c1]

TABLE 1-continued
Dye 22
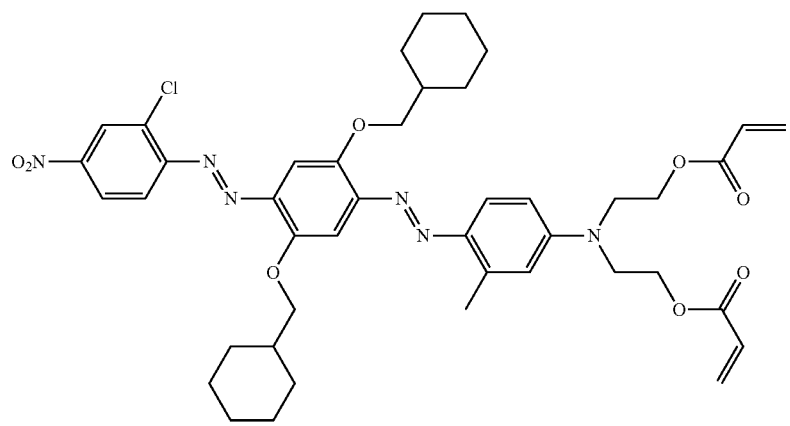 [SMILES: C=CC(=O)OCCN(CCOC(=O)C=C)c1ccc(/N=N/c2cc(OCC3CCCCC3)c(/N=N/c3ccc([N+](=O)[O-])cc3Cl)cc2OCC2CCCCC2)c(C)c1]
Dye 23
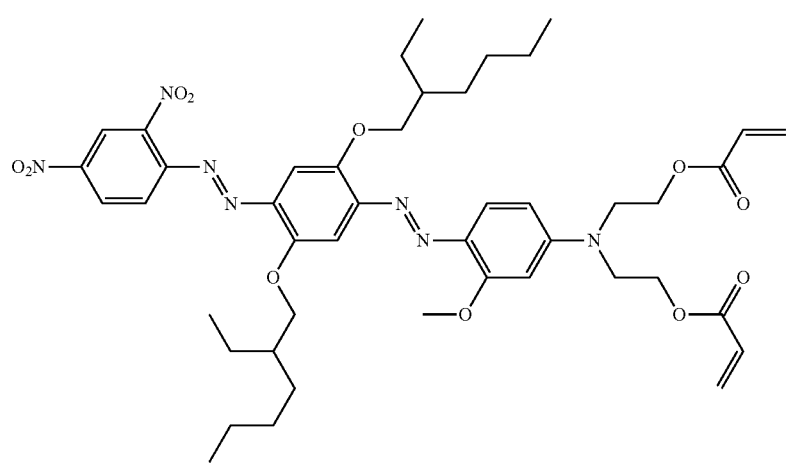 [SMILES: C=CC(=O)OCCN(CCOC(=O)C=C)c1ccc(/N=N/c2cc(OCC(CC)CCCC)c(/N=N/c3ccc([N+](=O)[O-])cc3[N+](=O)[O-])cc2OCC(CC)CCCC)c(OC)c1]
Dye 24
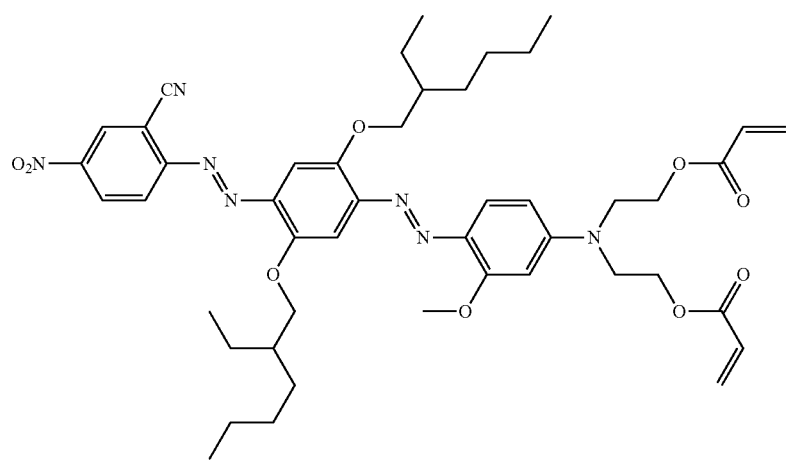 [SMILES: C=CC(=O)OCCN(CCOC(=O)C=C)c1ccc(/N=N/c2cc(OCC(CC)CCCC)c(/N=N/c3ccc([N+](=O)[O-])cc3C#N)cc2OCC(CC)CCCC)c(OC)c1]

TABLE 1-continued

Dye 25

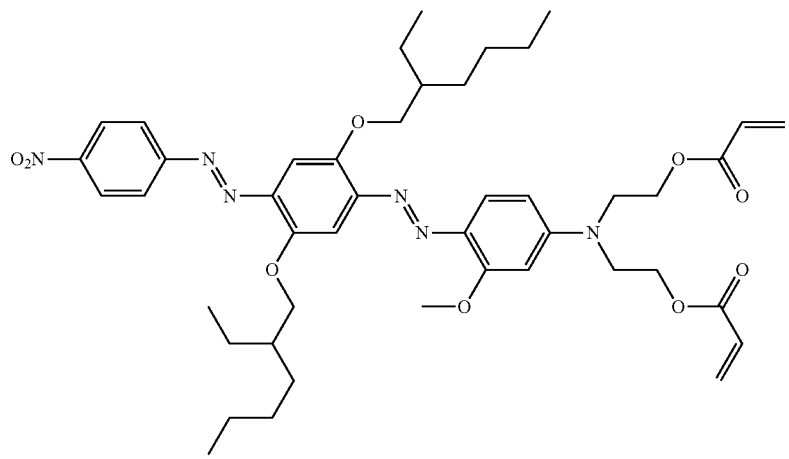 [SMILES: C=CC(=O)OCCN(CCOC(=O)C=C)c1ccc(/N=N/c2cc(OCC(CC)CCCC)c(/N=N/c3ccc([N+](=O)[O-])cc3)cc2OCC(CC)CCCC)c(OC)c1]

Dye 26

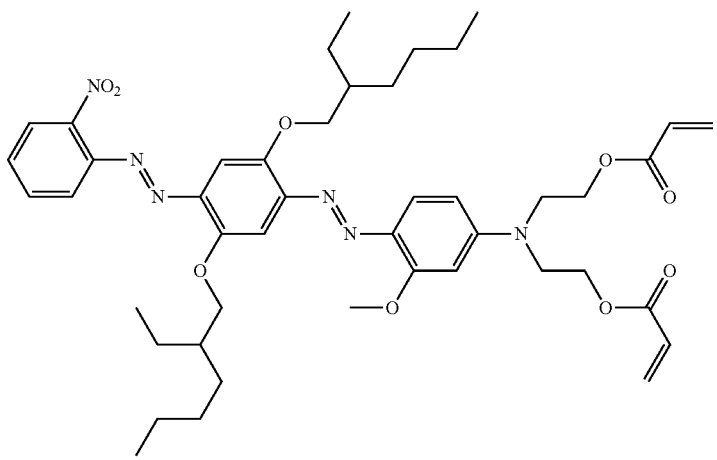 [SMILES: C=CC(=O)OCCN(CCOC(=O)C=C)c1ccc(/N=N/c2cc(OCC(CC)CCCC)c(/N=N/c3ccccc3[N+](=O)[O-])cc2OCC(CC)CCCC)c(OC)c1]

The following schemes show by way of example for Dyes 1, 2, and 3 the synthesis of polymerisable dyes of the invention, especially for dyes of Formulas (2) to (5), which can be carried out by processes and under conditions known to the person skilled in the art:

Scheme 1: Dyes of Formula (2) and (3):
The preparation of polymerisable dyes of Formulas (2) and (3) by a 4 step procedure under convenient conditions as known in the art is exemplified in the following scheme for 2,2'-(2-((4-(dioctylamino)-2-methylphenyl)diazenyl)-5-((4-nitrophenyl)diazenyl)-1,4-phenylene)bis(oxy)bis(ethane-2,1-diyl) diacrylate (Dye 1):

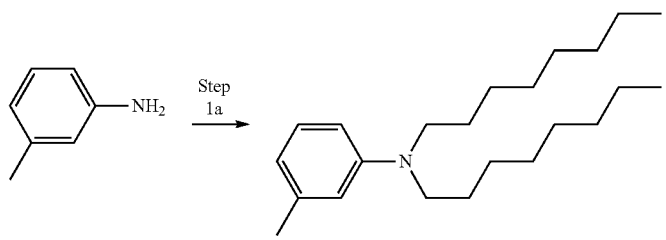

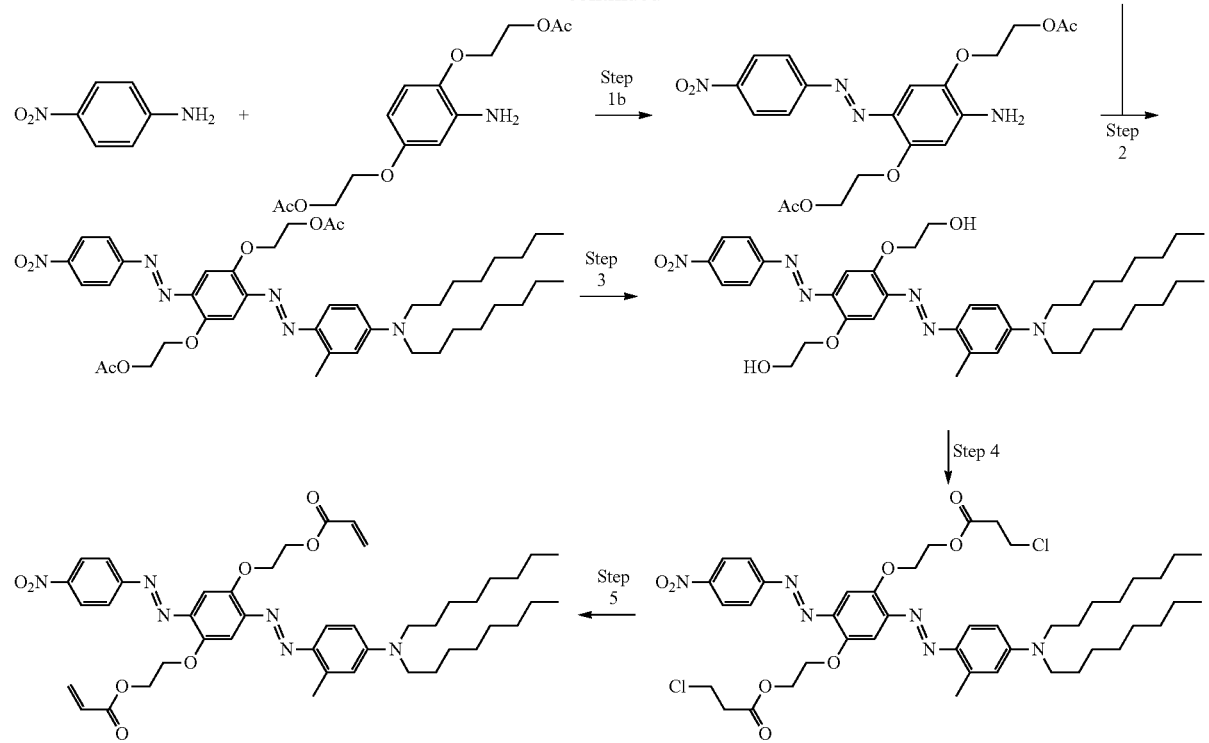
-continued

Scheme 2: Dyes of Formula (4):
The preparation of polymerisable dyes of Formulas (4) by a 4 step procedure under convenient conditions as known in the art is exemplified in the following scheme for 2,2'-(2-(((4-Dioctylamino)-2-methylphenyl)diazenyl)-5-((4-nitrophenyl)diazenyl)-1,4-phenylene)bis(oxy)bis(ethane-2,1-diyl)diacrylate (Dye 2):
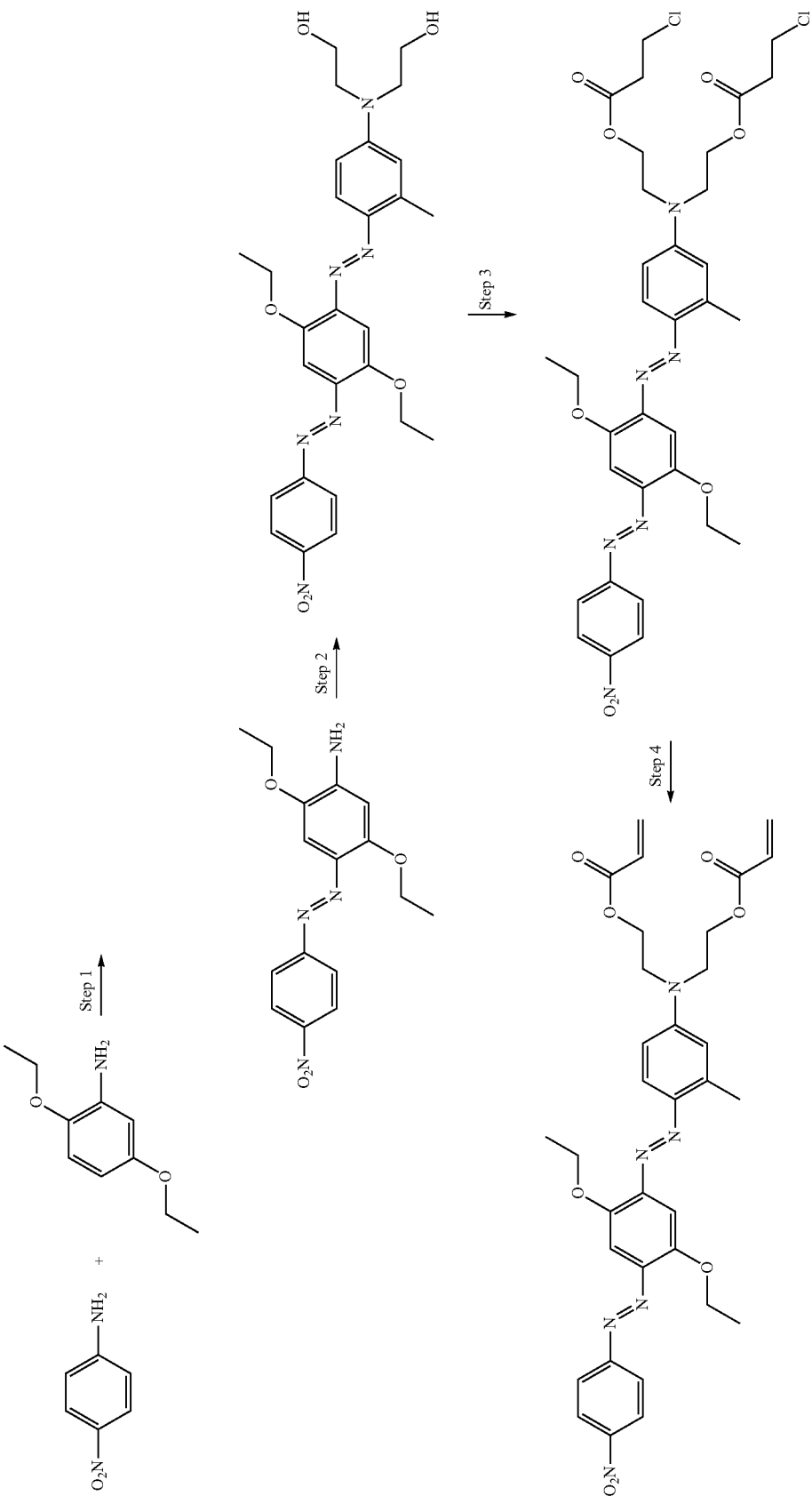

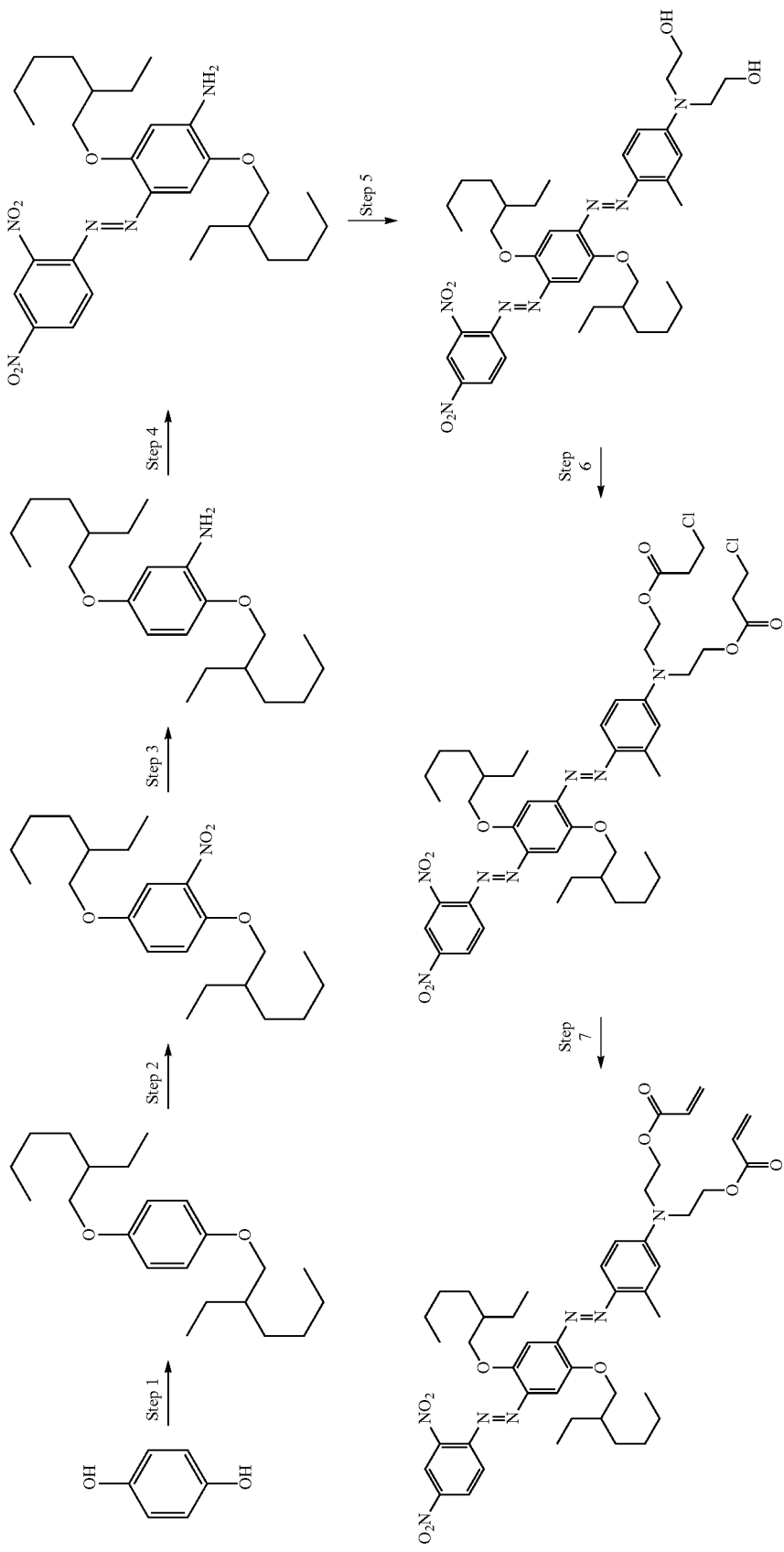
Scheme 3: Dyes of Formula (5):
The preparation of polymerisable dyes of Formula (5) by a 7 step procedure under convenient conditions as known in the art is exemplified in the following scheme for (Dye 3):

The preparation of further polymerisable dyes according to the invention can be carried out analogously to the illustrative reactions shown above. Further subjects of the invention are polymerisable dyes of Formulas (1) to (5) and the processes of their preparation as disclosed in Schemes 1 to 3.

All process steps described above and below can be carried out using known techniques and standard equipments which are described in prior art and are well-known to the skilled person.

The present process for the preparation of polymer particles preferably comprises a) the polymerisation of at least one polymerisable dye of Formula (1), at least one monomer, at least one initiator, and optionally at least one charged co-monomer by dispersion polymerisation in at least one non-aqueous, non-polar solvent, and optionally b) washing and drying the polymer particles.

The polymer particles of the invention can preferably be prepared by copolymerisation in a non-aqueous, non-polar solvent, especially by copolymerisation of at least one polymerisable dye of Formula (1), methyl methacrylate (MMA), methacrylic acid, stabiliser, and initiator, or by emulsion polymerisation, especially by an emulsifier-free batch emulsion polymerisation process.

Preferably black polymerisable dyes of Formula (1) are used to prepare black polymer particles for use in electrophoretic devices. Preferably one black polymerisable dye is used. However, at least two polymerisable dyes of Formula (1) may be used for the preparation of black polymer particles. In a variant of the invention, at least one of the polymerisable dyes of Formula (1) is used in combination with at least one other polymerisable dye, e.g. those described in WO 2010/089057 and in WO 2012/019704. Such combinations may be especially useful for the preparation of polymer particles which are of a neutral black colour. Optionally yellow polymerisable dyes like Dye A and Dye B or cyan polymerisable dyes like Dye C or magenta polymerisable dyes like Dye D may be used in combination with dyes of Formula (1).

Dye A

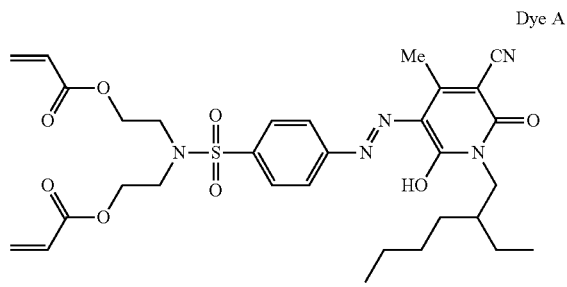

Dye B

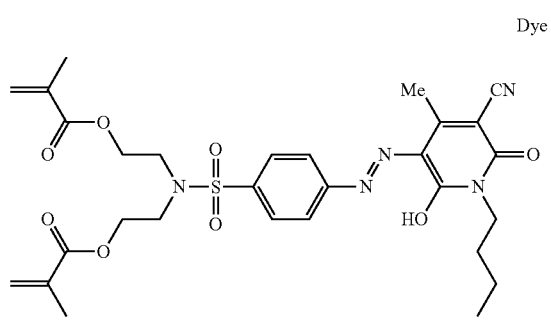

Dye C

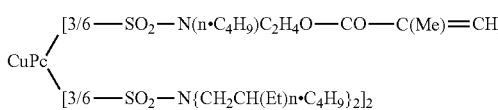

Dye D

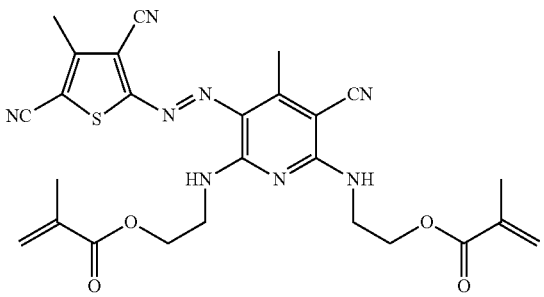

Preferably, the polymer particles of the invention can be prepared in a simple 1-step reaction in a non-aqueous, preferably non-polar medium. Solvents with a low dielectric constant are preferably used. So, the particles are formed directly in a solvent which is highly suitable as an EPD fluid. This also allows transfer to other solvents suitable for EPD if so desired. The preferred solvents are non-polar hydrocarbon solvents, especially such used in EPD fluids, i.e. the Isopar series (Exxon-Mobil), Norpar, Shell-Sol (Shell), Sol-Trol (Shell), naphtha, and other petroleum solvents, as well as long chain alkanes such as dodecane, tetradecane, hexadecane, decane and nonane. Especially preferred is dodecane. Preferably the polymer particles are simply separated from the reaction suspension by filtration, preferably by pouring the suspension through a pore size filter, i.e. a 5 μm pore size filter, or the particles can be cleaned by centrifuging.

The selection of the polymerisation conditions depends on the required size and size distribution of the particles. Adjustment of polymerisation conditions is well known to someone skilled in the art.

Preferably, a batch polymerisation process is used wherein all reactants are completely added at the outset of the polymerisation process. In such process only relatively few variables have to be adjusted for a given formulation. Preferred changes which can be made in such cases are to the reaction temperature, reactor design and the type and speed of stirring.

Thus, a batch polymerisation process is used for manufacture versus a semi-continuous batch process because of limited versatility and simple evaluations of reaction formulation.

This route avoids the use of aqueous medium as previously reported for the syntheses of coloured polymer particles for EPD. Whereas preparation in aqueous medium has obvious advantages in terms of health, safety and environmental terms, ultimately the coloured polymer particles have to be redispersed in a non-aqueous, non-polar medium for use in EPD. If the particles are prepared in water, then usually a long and power consuming process such as freeze drying or spray drying is required to remove the water. This route avoids such time consuming steps and the coloured polymer particles do not have to be redispersed in to a suitable non-polar solvent for EPD. This route also avoids introducing unwanted traces of water into the EPD dispersion. Therefore, this process provides a one-step reaction to prepare coloured particles suitable for EPD, without the requirement of freeze or spray drying enabling a cost effective production process. No transfer of solvents is required.

Preferably the polymerisation is a free radical polymerisation.

Usually, a monomer composition according to the invention comprises at least one polymerisable dye according to Formula (1), at least one monomer, at least one initiator, preferably at least one steric stabiliser, and optionally at least one charged co-monomer in a non-aqueous solvent Preferably, a monomer composition according to the invention comprises at least one polymerisable dye according to Formula (1), at least one monomer, a steric stabiliser, an initiator, and a non-aqueous, non-polar solvent.

The monomers described in the following for preparation of the polymer particles can be combined with the polymerisable dyes to produce a polymerisable dye/monomer mixture and/or the monomers can be incorporated stepwise into the polymerisable mixture to produce special effects, for example a core-shell effect so that there is more dye on the shell of the particles. Particularly preferable are monomers which are similar to the polymerisable dye.

The polymer particles can be prepared from most monomer types, in particular methacrylates, acrylates, acrylamides, methacrylamides, acrylonitriles, α-substituted acrylates, styrenes and vinyl ethers, vinyl esters, propenyl ethers, oxetanes and epoxys but would typically be prepared from largest percentage to be monomer, then cross-linker, and include a charged monomer (e.g. quatemised monomer).

The following are all examples which could be used and which are commercially available from the Sigma-Aldrich chemical company. Mixtures of monomers may also be used.
Methacrylates:

Methyl methacrylate (MMA), Ethyl methacrylate (EMA), n-Butyl methacrylate (BMA), 2-Aminoethyl methacrylate hydrochloride, Allyl methacrylate, Benzyl methacrylate, 2-Butoxyethyl methacrylate, 2-(tert-Butylamino)ethyl methacrylate, Butyl methacrylate, tert-Butyl methacrylate, Caprolactone 2-(methacryloyloxy)ethyl ester, 3-Chloro-2-hydroxypropyl methacrylate, Cyclohexyl methacrylate, 2-(Diethylamino)ethyl methacrylate, Di(ethylene glycol) methyl ether methacrylate, 2-(Dimethylamino)ethyl methacrylate, 2-Ethoxyethyl methacrylate, Ethylene glycol dicyclopentenyl ether methacrylate, Ethylene glycol methyl ether methacrylate, Ethylene glycol phenyl ether methacrylate, 2-Ethylhexyl methacrylate, Furfuryl methacrylate, Glycidyl methacrylate, Glycosyloxyethyl methacrylate, Hexyl methacrylate, Hydroxybutyl methacrylate, 2-Hydroxyethyl methacrylate, 2-Hydroxyethyl methacrylate, Hydroxypropyl methacrylate Mixture of hydroxypropyl and hydroxylsopropyl methacrylates, 2-Hydroxypropyl 2-(methacryloyloxy) ethyl phthalate, Isobomyl methacrylate, Isobutyl methacrylate, 2-Isocyanatoethyl methacrylate, Isodecyl methacrylate, Lauryl methacrylate, Methacryloyl chloride, Methacrylic acid, 2-(Methylthio)ethyl methacrylate, mono-2-(Methacryloyloxy)ethyl maleate, mono-2-(Methacryloyloxy)ethyl succinate, Pentabromophenyl methacrylate, Phenyl methacrylate, Phosphoric acid 2-hydroxyethyl methacrylate ester, Stearyl methacrylate, 3-Sulfopropyl methacrylate potassium salt, Tetrahydrofurfuryl methacrylate, 3-(Trichlorosilyl)propyl methacrylate, Tridecyl methacrylate, 3-(Trimethoxysilyl) propyl methacrylate, 3,3,5-Trimethylcyclohexyl methacrylate, Trimethylsilyl methacrylate, Vinyl methacrylate. Preferably Methyl methacrylate (MMA), Methacrylic acid, Ethyl methacrylate (EMA), and/or n-Butyl methacrylate (BMA) are used.
Acrylates:

Acrylic acid, 4-Acryloylmorpholine, [2-(Acryloyloxy) ethyl]trimethylammonium chloride, 2-(4-Benzoyl-3-hydroxyphenoxy)ethyl acrylate, Benzyl 2-propylacrylate, 2-Butoxyethyl acrylate, Butyl acrylate, tert-Butyl acrylate, 2-[(Butylamino)carbonyl]oxy]ethyl acrylate, tert-Butyl 2-bromoacrylate, 4-tert-Butylcyclohexyl acrylate, 2-Carboxyethyl acrylate, 2-Carboxyethyl acrylate oligomers anhydrous, 2-(Diethylamino)ethyl acrylate, i(ethylene glycol) ethyl ether acrylate technical grade, Di(ethylene glycol) 2-ethyihexyl ether acrylate, 2-(Dimethylamino)ethyl acrylate, 3-(Dimethylamino)propyl acrylate, Dipentaerythritol penta-/hexa-acrylate, 2-Ethoxyethyl acrylate, Ethyl acrylate, 2-Ethylacryloyl chloride, Ethyl 2-(bromomethyl)acrylate, Ethyl cis-(β-cyano)acrylate, Ethylene glycol dicydopentenyl ether acrylate, Ethylene glycol methyl ether acrylate, Ethylene glycol phenyl ether acrylate, Ethyl 2-ethylacrylate, 2-Ethylhexyl acrylate, Ethyl 2-propylacrylate, Ethyl 2-(trimethylsilylmethyl)acrylate, Hexyl acrylate, 4-Hydroxybutyl acrylate, 2-Hydroxyethyl acrylate, 2-Hydroxy-3-phenoxypropyl acrylate, Hydroxypropyl acrylate, Isobomyl acrylate, Isobutyl acrylate, Isodecyl acrylate, Isooctyl acrylate, Lauryl acrylate, Methyl 2-acetamidoacrylate, Methyl acrylate, Methyl α-bromoacrylate, Methyl 2-(bromomethyl)acrylate, Methyl 3-hydroxy-2-methylenebutyrate, Octadecyl acrylate, Pentabromobenzyl acrylate, Pentabromophenyl acrylate, Poly(ethylene glycol) methyl ether acrylate, Poly (propylene glycol) acrylate, Poly(propylene glycol) methyl ether acrylate Soybean oil, epoxidized acrylate, 3-Sulfopropyl acrylate potassium salt, Tetrahydrofurfuryl acrylate, 3-(Trimethoxysilyl)propyl acrylate, 3,5,5-Trimethylhexyl acrylate. Preferably Methyl acrylate, acrylic acid, Ethyl acrylate (EMA), and/or n-Butyl acrylate (BMA) are used.
Acrylamides:

2-Acrylamidoglycolic acid, 2-Acrylamido-2-methyl-1-propanesulfonic acid, 2-Acrylamido-2-methyl-1-propanesulfonic acid sodium salt solution, (3-Acrylamidopropyl)trimethylammonium chloride solution, 3-Acryloylamino-1-propanol solution purum, N-(Butoxymethyl)acrylamide, N-tert-Butylacrylamide, Diacetone acrylamide, N,N-Dimethylacrylamide, N-[3-(Dimethylamino)propyl]methacrylamide, N-Hydroxyethyl acrylamide, N-(Hydroxymethyl) acrylamide, N-(Isobutoxymethyl)acrylamide, N-Isopropylacrylamide, N-Isopropylmethacrylamide, Methacrylamide, N-Phenylacrylamide, N-[Tris(hydroxymethyl) methyl]acrylamide,
Styrenes Styrene, Divinyl benzene, 4-Acetoxystyrene, 4-Benzyloxy-3-methoxystyrene, 2-Bromostyrene, 3-Bromostyrene, 4-Bromostyrene, α-Bromostyrene, 4-tert-Butoxystyrene, 4-tert-Butyistyrene, 4-Chloro-α-methylstyrene, 2-Chlorostyrene, 3-Chlorostyrene, 4-Chlorostyrene, 2,6-Dichlorostyrene, 2,6-Difluorostyrene, 1,3-Diisopropenylbenzene, 3,4-Dimethoxystyrene, α,2-Dimethylstyrene, 2,4-Dimethylstyrene, 2,5-Dimethylstyrene, N, N-Dimethyvinylbenzylamine, 2,4-Diphenyl-4-methyl-1-pentene, 4-Ethoxystyrene, 2-Fluorostyrene, 3-Fluorostyrene, 4-Fluorostyrene, 2-Isopropenylaniline, 3-Isopropenyl-α,α-dimethylbenzyl isocyanate, Methylstyrene, α-Methylstyrene, 3-Methylstyrene, 4-Methylstyrene, 3-Nitrostyrene, 2,3,4,5,6-Pentafluorostyrene, 2-(Trifluoromethyl)styrene, 3-(Trifluoromethyl)styrene, 4-(Trifluoromethyl)styrene, 2,4,6-Trimethylstyrene. Preferably Styrene and/or Divinyl benzene are used.
Vinyl Groups 3-Vinylaniline, 4-Vinylaniline, 4-Vinylanisole, 9-Vinylanthracene, 3-Vinylbenzoic acid, 4-Vinylbenzoic acid, Vinylbenzyl chloride, 4-Vinylbenzyl chloride, (Vinylbenzyl)trimethylammonium chloride, 4-Vinylbiphenyl, 2-Vinylnaphthalene, 2-Vinylnaphthalene, Vinyl acetate, Vinyl benzoate, Vinyl 4-tert-butylbenzoate, Vinyl chloroformate, Vinyl chloroformate, Vinyl cinnamate, Vinyl decanoate, Vinyl neodecanoate, Vinyl neononanoate, Vinyl pivalate, Vinyl propionate, Vinyl stearate, Vinyl trifluoroacetate, Other monomers which may be used are those which have groups to help stabilisation of the particles, e.g. Poly(ethylene glycol) methyl ether acrylate, Poly(ethylene glycol) phenyl ether acrylate, lauryl methacrylate, Poly(ethylene glycol) methyl ether acrylate, Poly(propylene glycol) methyl ether acrylate, Lauryl acrylate and fluorinated monomers of above.

Some of the monomers have groups for further reaction if so desired, e.g. Glycidyl ethacrylate, 2-Hydroxyethyl methacrylate.

The following compounds can be used as intraparticle crosslinking monomers for solubility control and solvent swelling resistance: ethylene glycol dimethacrylate (EGDMA), allyl methacrylate (ALMA), divinyl benzene, Bis[4-(vinyloxy)butyl]adipate, Bis[4-(vinyloxy)butyl]1,6-hexanediylbiscarbamate, Bis[4-(vinyloxy)butyl]isophthalate, Bis[4-(vinyloxy)butyl](methylenedi-4,1-phenylene)biscarbamate, Bis[4-(vinyloxy)butyl]succinate, Bis[4-(vinyloxy)butyl]terephthalate, Bis[4-(vinyloxymethyl)cyclohexylmethyl]glutarate, 1,4-Butanediol divinyl ether, 1,4-Butanediol vinyl ether, Butyl vinyl ether, tert-Butyl vinyl ether, 2-Chloroethyl vinyl ether, 1,4-Cyclohexanedimethanol divinyl ether, 1,4-Cyclohexanedimethanol vinyl ether, Di(ethylene glycol)divinyl ether, Di(ethylene glycol) vinyl ether, Ethylene glycol butyl vinyl ether, Ethylene glycol vinyl ether, Tris[4-(vinyloxy)butyl]trimellitate, 3-(Acryloyloxy)-2-hydroxypropyl methacrylate, Bis[2-(methacryloyloxy)ethyl] phosphate, Bisphenol A propoxylate diacrylate, 1,3-Butanediol diacrylate, 1,4-Butanediol diacrylate, 1,3-Butanediol dimethacrylate, 1,4Butanediol dimethacrylate, N,N'-(1,2-Dihydroxyethylene)bisacrylamide, Di(trimethylolpropane)tetraacrylate, Diurethane dimethacrylate, N,N'-Ethylenebis(acrylamide), Glycerol 1,3-diglycerolate, Glycerol dimethacrylate, 1,6-Hexanediol diacrylate, 1,6-Hexanediol dimethacrylate, 1,6-Hexanediylbis[oxy(2-hydroxy-3, i-propanediyl)]bisacrylate, Hydroxypivalyl hydroxypivalate bis[6-(acryloyloxy)hexanoate], Neopentyl glycol diacrylate, Pentaerythritol diacrylate, Pentaerythritol tetraacrylate, Pentaerythritol triacrylate, Poly(propylene glycol)diacrylate, Poly(propylene glycol)dimethacrylate, 1,3,5-Triacryloylhexahydro-1,3,5-triazine, Tricyclo[5.2.1.0]decanedimethanol diacrylate, Trimethylolpropane benzoate diacrylate, Trimethylolpropane ethoxylate methyl ether diacrylate, Trimethylolpropane ethoxylate triacrylate, Trimethylolpropane triacrylate, Trimethylolpropane trimethacrylate, Tris[2-(acryloyloxy)ethyl]isocyanurate, Tri(propylene glycol)diacrylate.

Optionally, the monomer composition comprises at least one charged co-monomer.

Examples of cationic monomers for particle stability and particle size control are 2-methacryloxy ethyl trimethyl ammonium chloride (MOTAC), acryloxy ethyl trimethyl ammonium chloride (AOTAC), [3-(Methacryloylamino)propyl]trimethylammonium chloride, [2-(Methacryloyloxy)ethyl]trimethylammonium methyl sulfate solution, tetraallyl ammonium chloride, diallyl dimethyl ammonium chloride, (Vinylbenzyl)trimethylammonium chloride. Preferably 2-methacryloxy ethyl trimethyl ammonium chloride (MOTAC) and acryloxy ethyl trimethyl ammonium chloride (AOTAC) are used.

Examples of anionic monomers are sodium, potassium or triethylamine salts of methacrylic acid, Acrylic acid, 2-(Trifluoromethyl)acrylic acid, 3-(2-Furyl)acrylic acid, 3-(2-Thienyl)acrylic acid, 3-(Phenylthio)acrylic acid, Poly(acrylic acid) potassium salt, Poly(acrylic acid) sodium salt, Poly(acrylic acid), Poly(acrylic acid, sodium salt) solution, trans-3-(4-Methoxybenzoyl)acrylic acid, 2-Methoxycinnamic acid, 3-Indoleacrylic acid, 3-Methoxycinnamic acid, 4-Imidazoleacrylic acid, 4-Methoxycinnamic acid, Poly(styrene)-block-poly(acrylic acid), Poly(acrylonitrile-co-butadiene-co-acrylic acid), dicarboxy terminated, Poly(acrylonitrile-co-butadiene-co-acrylic acid), dicarboxy terminated, glycidyl methacrylate diester, 2,3-Diphenyl-Acrylic Acid, 2-Me-Acrylic Acid, 3-(1-Naphthyl)Acrylic Acid, 3-(2,3,5,6-Tetramethylbenzoyl)Acrylic Acid, 3-(4-Methoxyphenyl)Acrylic Acid, 3-(4-Pyridyl)Acrylic Acid, 3-p-Tolyl-Acrylic Acid, 5-Norbomene-2-Acrylic Acid, Trans-3-(2,5-Dimethylbenzoyl)Acrylic Acid, Trans-3-(4-Ethoxybenzoyl)Acrylic Acid, Trans-3-(4-Methoxybenzoyl)Acrylic Acid, 2,2'-(1,3-Phenylene)Bis(3-(2-aminophenyl)Acrylic Acid), 2,2'-(1,3-Phenylene)Bis(3-(2-Aminophenyl)Acrylic Acid) hydrochloride, 2,2'-(1,3-Phenylene)Bis(3-(2-Nitrophenyl)Acrylic Acid), 2-[2-(2',4'-Difluoro[1,1'-Biphenyl]-4-YI)-2-Oxoethyl]Acrylic Acid, 2-(2-(2-Chloroanilino)-2-Oxoethyl)-3-(4-Methoxyphenyl)Acrylic Acid, 2-(2-((2-Hydroxyethyl)Amino)-2-Oxoethyl)-3-(4-Methoxyphenyl)Acrylic Acid, 2-(2-(Cyclohexylamino)-2-Oxoethyl)-3-(4-Methoxyphenyl)Acrylic Acid.

A preferred monomer composition comprises methyl methacrylate and methacrylic acid, in combination with at least one polymerisable dye according to Formula (1). Preferably such monomer compositions comprise at least one polymerisable dye of Formulas (2) to (5). Most preferred are the polymerisable dyes listed in Table 1, especially Dye 1, Dye 2, and Dye3.

Preferably, an oil soluble initiator is used in the non-aqueous copolymerisation in order to control size, particle morphology and to reduce the residual monomers at the end of the reaction. Preferably an oil-soluble thermal initiator is added in step c) of the present process. Examples are 2,2'-Azobis(4-methoxy-2.4-dimethyl valeronitrile), 2,2'-Azobis(N-butyl2-methylpropionamide), 2,2'-Azobis(2.4-dimethyl valeronitrile), Dimethyl 2,2'-azobis(2-methylpropionate), 2,2'-Azobis(2-methylbutyronitrile), also known as Vazo 67 (DuPont), 1,1'-Azobis(cyclohexane-1-carbonitrile), 2,2'-Azobis[N-(2-propenyl)-2-methylpropionamide], 1-[(1-cyano-1-methylethyl)azo]formamide, 2,2'-Azobis(N-cyclohexyl-2-methylpropion-amide) (all available from Wako); Vazo 52 and Vazo 64 (available from DuPont), Luperox 331.

Preferably 2,2'-Azobis(2.4-dimethyl valeronitrile), Dimethyl 2,2'-azobis(2-methylpropionate), 2,2'-Azobis(2-methylbutyronitrile) or Vazo 67 are used.

Preferably the polymerisation according to the invention is a free radical polymerisation. Usually, polymerisation compositions as described above, especially compositions comprising the above-mentioned preferred compounds, are used. A preferred monomer composition comprises methyl methacrylate and ethylene glycol dimethacrylate as a cross-linker and 2-methacryloxy ethyl trimethyl ammonium chloride (MOTAC) as reactive charged monomer in combination with at least one the polymerisable dyes according to Formula (1). Preferably such monomer compositions comprise at least one polymerisable dye of Formulas (2) to (5). Most preferred are the polymerisable dyes listed in Table 1, especially Dye 1, Dye 2, and Dye3.

The polymerisable composition of the invention usually comprises 0.1-15, preferably 1-10%, by weight of at least one polymerisable dye according to Formula (1), 50-95%, preferably 70-90%, by weight of monomer, 1-40%, preferably 1-10%, by weight of crosslinking monomer, 1-30%, preferably 1-10%, by weight of ionic monomer and 0.1-10%, preferably 0.1-5%, by weight of initiator, all percentages are based on the total weight of the polymerizable composition (except solvent). Combinations of polymerisable dyes according to Formula (1) with other polymerisable dyes may also be used in such compositions.

Polymer particles prepared according to the invention are preferably spherical particles with a size (diameter) in the range of 50-1200 nm, preferably 50-1000 nm and preferably with a monodisperse size distribution. Preferred particle sizes are 150-950 nm. In a variant of the invention preferred particle sizes are 500-950 nm. Particle sizes are determined by photon correlation spectroscopy of hydrocarbon particle dispersions by a common apparatus such as a Malvem NanoZS particle analyser or preferably by SEM (Scanning Electron Microscopy) and image analysis.

To enhance the surface stabilisation or steric repulsions of the polymeric particles in a non-polar continuous phase, a steric stabiliser is preferably incorporated into the coloured polymer particles. Preferably a non-aqueous dispersion (NAD) stabiliser is adsorbed on to the particle.

Suitable NAD stabilisers are block copolymers with a comb shape structure. Especially block copolymers with a molecular weight of approximately 10,000-100,000 can be used. The molecular weight ratio of the backbone to hairs may be approximately 1:1. The particle dispersion medium (non-polar solvent) preferably is a poor solvent for the backbone. The backbone chemistry preferably is similar to the particle. The length of the hairs preferably is of the order of the distance required to sterically stabilise the particles. The particle dispersion medium preferably is a good solvent for the hairs. It is possible to attach chromophores and/or charging groups to the backbone and or the hairs. NAD stabilisers are commercially available or can be prepared to known methods, e.g. as described in 'Dispersion Polymerization in Organic Media', ISBN 0471 054186, edited by K. E. J. Barrett, published by John Wiley and Sons, Copyright 1975, by Imperial Chemical Industries Ltd. Preferred NAD stabilisers are for example poly(hydroxystearic acid), and poly(hydroxystearic acid) graft (poly) methyl methacrylate and methacrylic acid copolymers, Solsperse 3000, Solsperse 11,200, Solsperse 13,300 and Solsperse 13,240 from Lubrizol Ltd., UK. Advantageously stabilisers comprising additionally copolymerised glycidyl methacrylate may be permanently locked in the polymer particle. This is simply done in the same vessel, by raising the temperature and adding diethanolamine. This opens up a glycidyl ring which is then available to polymerise with unreacted carboxylic acid groups from a methacrylic acid monomer.

Cross-linked copolymer nanoparticles can preferably be prepared by copolymerisation of methyl methacrylate (MMA), methacrylic acid, dye monomer, especially the above-mentioned preferred dye monomers, in particular those listed in table 1,1-octanethiol and NAD stabiliser using azobisisobutyronitrile (AIBN) or 2,2'-Azobis(2-methylbutyronitrile (Vazo 67) as an initiator. Preferably, polymerisations are conducted using a batch process.

The polymerisable dyes of the invention can also be used for the preparation of polymer particles by colouring polymer particles with the polymerisable dyes and subsequent polymerisation of the dye within the particles as described in WO 2010/089059.

The dyes can also be pre-polymerised before being used for colouring polymer particles as described in WO 2010/089058.

Polymer particles of the invention are primarily designed for use in electrophoretic displays. So, further subjects of the invention are electrophoretic fluids and electrophoretic displays comprising a typical electrophoretic display which preferably consists of the particles dispersed in a low polar or non-polar solvent along with additives to improve electrophoretic properties, such as stability and charge. Examples of such electrophoretic dispersions are well described in the literature, for example U.S. Pat. No. 7,247,379; WO 99/10767; US 2007/0128352; U.S. Pat. Nos. 7,236,290; 7,170,670; 7,038,655; 7,277,218; 7,226,550; 7,110,162; 6,956,690; 7,052,766; 6,194,488; 5,783,614; 5,403,518; 5,380,362.

Typical additives to improve the stability of the electrophoretic fluid (either by steric stabilisation or by use as a charging agent) are known to experts in the field and include (but are not limited to) the Brij, Span and Tween series of surfactants (Aldrich), the Solsperse, Ircosperse and Colorburst series (Lubrizol), the OLOA charging agents (Chevron Chemicals) and Aerosol-OT (Aldrich).

Any other additives to improve the electrophoretic properties can be incorporated provided they are soluble in the formulation medium, in particular thickening agents or polymer additives designed to minimise settling effects.

The dispersion solvent can be chosen primarily on the basis of dielectric constant, refractive index, density and viscosity. A preferred solvent choice would display a low dielectric constant (<10, more preferably <5), high volume resistivity (about $10^{15}$ ohm-cm), a low viscosity (less than 5cst), low water solubility, a high boiling point (>80° C.) and a refractive index and density similar to that of the particles. Tweaking these variables can be useful in order to change the behavior of the final application. For example, in a slow-switching application such as poster displays or shelf labels, it can be advantageous to have an increased viscosity to improve the lifetime of the image, at the cost of slower switching speeds. However in an application requiring fast switching, for example e-books and displays, a lower viscosity will enable faster switching, at the cost of the lifetime in which the image remains stable (and hence an increase in power consumption as the display will need more frequent addressing). The preferred solvents are often non-polar hydrocarbon solvents such as the Isopar series (Exxon-Mobil), Norpar, Shell-Sol (Shell), Sol-Trol (Shell), naphtha, and other petroleum solvents, as well as long chain alkanes such as dodecane, tetradecane, hexadecane, decane and nonane, and also dimethyltetralin. These tend to be low dielectric, low viscosity, and low density solvents. A density matched particle/solvent mixture will yield much improved settling/sedimentation characteristics and thus is desirable. For this reason, often it can be useful to add a halogenated solvent to enable density matching. Typical examples of such solvents are the Halocarbon oil series (Halocarbon products), or tetrachlorethylene, carbon tetrachloride, 1,2,4-trichlorobenzene and similar solvents. The negative aspect of many of these solvents is toxicity and environmental friendliness, and so in some cases it can also be beneficial to add additives to enhance stability to sedimentation rather than using such solvents.

The preferred additives and solvents used in the formulation of the particles of the invention are OLOA11000 (Chevron Chemicals), Ircosperse 2153 (Lubrizol Ltd), and dodecane (Sigma Aldrich)

Usually electrophoretic fluids comprise a charged inorganic particle such as titania, alumina or barium sulphate, coated with a surface layer to promote good dispersibility in dielectric media and a dielectric fluid media. The black polymer particles of the invention can be used in combination with white reflective, coloured reflective and/or CMY transmissive plus white reflective particles. Furthermore, the polymer particles of the present invention may be used in combination with white reflective and/or coloured particles prepared by a process comprising the steps of a) forming a reverse emulsion comprising at least one polymer, at least one white reflective or coloured particle, at least one polar solvent, at least one non-polar solvent, and at least one surfactant and b) removing the polar solvent or polar solvents by evaporative methods. "Reverse emulsion" means that a non-polar solvent (preferably dodecane, or comparable aliphatic hydrocarbons)) forms the continuous phase and a polar solvent (preferably water) forms the discontinuous phase. Such process is also called either "evaporative precipitation" or "reverse emulsion solvent removal" (RESR) due to the steps involved in forming a reverse emulsion and then removing the solvent from the internal phase by evaporative methods to form a solid particle. Coloured particle prepared according to WO 2010/089057 may also be used in combination with polymer particles of the invention.

The solvents and additives used to disperse the polymer particles of the invention are not limited to those used within the examples of this invention and many other solvents and/or dispersants can be used. Lists of suitable solvents and dispersants for electrophoretic displays can be found in existing literature, in particular WO 99/10767 and WO 2005/017046. The electrophoretic fluid is then incorporated into an electrophoretic display element by a variety of pixel architectures, such as can be found in C. M. Lampert, Displays; 2004, 25(5) published by Elsevier B.V., Amsterdam.

The electrophoretic fluid may be applied by several techniques such as inkjet printing, slot die spraying, nozzle spraying, and flexographic printing, or any other contact or contactless printing or deposition technique.

Electrophoretic displays comprise typically, the electrophoretic display media in close combination with a monolithic or patterned backplane electrode structure, suitable for switching the pixels or patterned elements between the black and white optical states or their intermediate greyscale states.

The electrophoretic particles according to the present invention are suitable for all known electrophoretic media and electrophoretic displays, e.g. flexible displays, one particle systems, two particle systems, dyed fluids, systems comprising microcapsules, microcup systems, air gap systems and others as described in C. M. Lampert, Displays; 2004, 25(5) published by Elsevier B.V., Amsterdam. Examples of flexible displays are dynamic keypads, e-paper watches, dynamic pricing and advertising, e-readers, rollable displays, smart card media, product packaging, mobile phones, lab tops, display card, digital signage.

The disclosures in the cited references are expressly also part of the disclosure content of the present patent application. In the claims and the description, the words "comprise/comprises/comprising" and "contain/contains/containing" mean that the listed components are included but that other components are not excluded. The following examples explain the present invention in greater detail without restricting the scope of protection.

EXAMPLES

The characterisation of the formulations is performed using a Malvern NanoZS particle analyser unless otherwise stated. This instrument measures the size of particles in dispersion and the zeta potential of an electrophoretic fluid. The Zeta potential (ZP) is derived from the real-time measurement of the electrophoretic mobility and thus is an indicator of the suitability of the fluid for use in electrophoretic applications.

Span 85 is purchased from Fluka. Vazo 67 (2,2'-Azobis(2-methylbutyro-nitrile) is purchased from Du Pont. All other chemicals are purchased from Sigma-Aldrich. All chemicals are purchased at the highest grade possible and are used without further purification unless otherwise stated.

The following abbreviations are used:
IMS industrial methylated spirit;
NMP N-Methylpyrrolidone
THF Tetrahydrofuran
Mp melting point Example 1

Preparation of 2,2'-(2-((4-(dioctylamino)-2-methylphenyl)-diazenyl)-5-((4-nitrophenyl)diazenyl-1,4-phenylene)bis(oxy)bis(ethane-2,1-diyl) diacrylate (Dye 1)
Prepared by a 5 step procedure as detailed below:

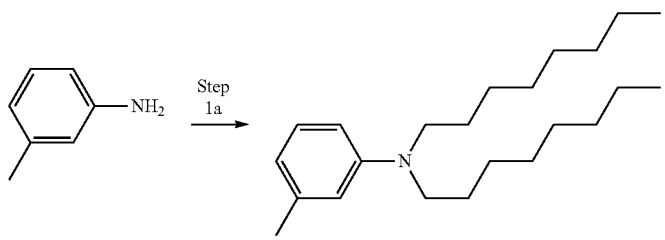

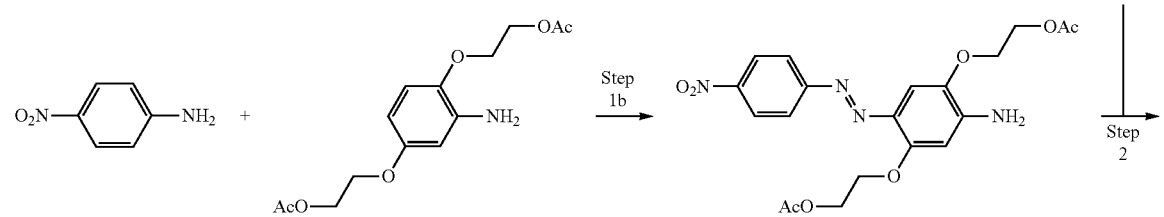

-continued

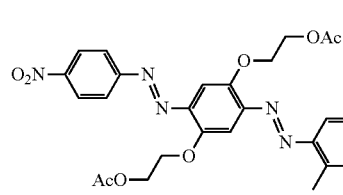 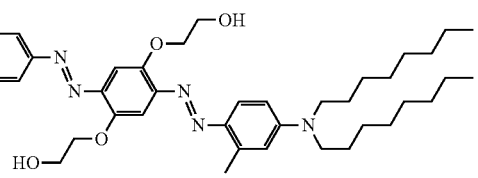

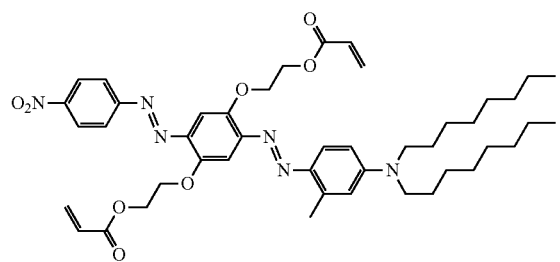 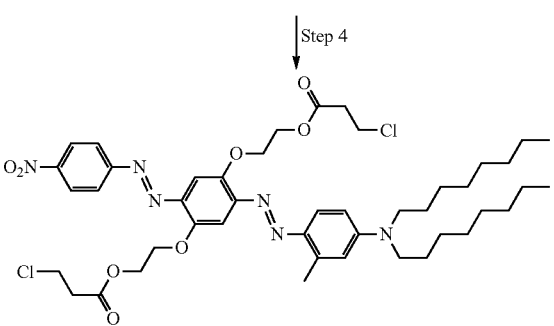

Step 1a: 3-Methyl-N,N-dioctylaniline m-Toluidine (26.75 g, 0.25 mol), water (30 ml), 1-bromooctane (144.9 g, 0.75 mol), and MgO (100.8 g, 2.5 mol) are charged to a flask and the resultant suspension is heated to 110° C. for 48 hours. The reaction mixture is allowed to cool and hexane is added, which causes precipitation of further solid. The solids are filtered-off to give an off-white filter cake and a yellow/brown filtrate. The filter cake is suspended in methylene chloride (100 ml), washed with dilute NaOH (3×100 ml), and dried over $MgSO_4$. The solution is filtered, then passed through a small pad of silica gel to give a pale yellow filtrate. Evaporation of solvent gives the product as a pale yellow free flowing oil (34.5 g, 42%). $^1$H NMR showed expected signals.

Step 1b: 2,2'-(2-Amino-5-((4-nitrophenyl)diazenyl)-1,4-phenylene)bis-(oxy)bis(ethane-2,1-diyl) diacetate 4-Nitroaniline (6.9 g, 0.05 mol) is suspended in dilute HCl and a solution of sodium nitrite (3.6 g, 0.053 mol) is added at 0-5° C., pH<1. Excess nitrous acid is destroyed by adding sulfamic acid and the solution is then added dropwise to solution of 2,2'-(2-amino-1,4-phenylene)bis(oxy)bis(ethane-2,1-diyl) diacetate in aqueous acetone. The resultant orange suspension is stirred overnight at ambient temperature before the solid is filtered-off, washing with water and industrial methylated spirits (IMS), then recrystallised from ethyl cellosolve, washing the isolated red solid with IMS and drying at 40° C. (16.0 g, 72%), mp=197-200° C. Structure is confirmed by $^1$H NMR.

Step 2: 2,2'-(2-((4-(dioctylamino)-2-methylphenyl)diazenyl)-5-((4-nitrophenyl)diazenyl)-1,4-phenylene)bis(oxy)bis(ethane-2,1-diyl) diacetate 2,2'-(2-Amino-5-((4-nitrophenyl)diazenyl)-1,4-phenylene)bis(oxy)bis(ethane-2,1-diyl) diacetate (4.5 g, 10 mmol) is stirred in N-methyl pyrollidone (45 ml) and warmed to 60° C. to dissolve. The solution is then cooled with stirring to 5° C., giving a thick, fine precipitate. Nitrosylsulfuric acid (40% w/w) (3.2 g, 10 mmol) is added dropwise causing all solids to dissolve. The reaction is stirred for a further 1.5 hours, warming slowly to 40° C. 3-Methyl-N,N-dioctylaniline (3.3 g, 10 mmol) and sulfamic acid (0.5 g) are dissolved in a mixture of acetone and IMS and to this is added ice/water, causing a fine suspension to form. The prepared diazonium salt solution is then added and the mixture is stirred overnight, allowing it to warm to room temperature. The black solid is filtered-off and dried (6.4 g, 81%). The solid is not purified further at this stage.

Step 3: 2,2'-(2-((4-(dioctylamino)-2-methylphenyl)diazenyl)-5-((4-nitrophenyl)diazenyl)-1,4-phenylene)bis(oxy)diethanol 2,2'-(2-((4-(Dioctylamino)-2-methylphenyl)diazenyl)-5-((4-nitrophenyl)diazenyl)-1,4-phenylene)bis(oxy)bis (ethane-2,1-diyl) diacetate (4.3 g, 5.5 mmol) is dissolved in tetrahydrofuran (100 ml), with stirring for 5 minutes, and to this is added 1N LiOH (25 ml, 25 mmol). The reaction is stirred at ambient temperature overnight. Acetic acid (5 ml) is added, followed by water (150 ml) which causes an oil to separate. After stirring for 1 h, the oil solidifies. The solid is filtered-off and washed with water (500 ml). The solid is crystallised from methylene chloride (200 ml) by addition of methanol (300 ml), and allowing overnight evaporation to a final volume of approximately 100 ml. The resultant black micro-crystalline solid is filtered-off and washed with methanol (30 ml). The solid is pulled dry under vacuum then dried for 2 hours in a desiccator (2.1 g, 54%). The material is used directly without further purification.

Step 4: 2,2'-(2-(4-(dioctylamino)-2-methylphenyl)diazenyl)-5-((4-nitrophenyl)diazenyl)-1,4-phenylene)bis(oxy)bis(ethane-2,1-diyl)bis(3-chloropropanoate)

2,2'-(2-((4-(Dioctylamino)-2-methylphenyl)diazenyl)-5-((4-nitrophenyl)diazenyl)-1,4-phenylene)bis(oxy)diethanol (3.5 g, 5.0 mmol) is dissolved in methylene chloride (40 ml) with stirring for 5 minutes, and to this is added potassium carbonate (2.6 g, 18.8 mmol) followed by 3-chloropropionyl chloride (3.8 g, 30 mmol). The flask is equipped with an air condenser and the reaction warmed in an oil bath at 35° C.

overnight, then for a further 72 hours at ambient temperature. Water (10 ml) and NaHCO₃ are added and the reaction stirred for 1 hour. The organic layer is separated, dried (MgSO₄) and evaporated. The crude product is purified over a short pad of silica gel, eluting initially with methylene chloride, which brings the bulk of the product through. The pad is then eluted with 10% acetone/methylene chloride, which elutes more of the required product and the lower running mono-ester. The later fraction is evaporated and re-purified over silica, eluting with methylene chloride until all of the required material is collected. The pure fractions are combined and evaporated to a black oil, which is solidified by triturating with methanol overnight. The solid is filtered-off and pulled dry to give a black solid. After drying overnight in a desiccator, a black powder is obtained (3.4 g, 77%).

Step 5: 2,2'-(2-((4-(dioctylamino)-2-methylphenyl) diazenyl)-5-((4 nitrophenyl)diazenyl)-1,4-phenylene) bis(oxy)bis(ethane-2,1-diyl) diacrylate (Dye 1)

2,2'-(2-((4-(Dioctylamino)-2-methylphenyl)diazenyl)-5-((4-nitrophenyl)diazenyl)-1,4-phenylene)bis(oxy)bis (ethane-2,1-diyl)bis(3-chloropropanoate) (3.4 g, 3.8 mmol) and 2,6-di-t-butylphenol (5 mg) are dissolved in methylene chloride (20 ml) and triethylamine (1.16 g, 11.5 mmol) is added. The reaction is shaken to mix, then stored in the dark in a cupboard overnight. The reaction is washed with 0.01M HCl (20 ml), dried and evaporated. The residue is re-dissolved in methylene chloride (10 ml) and methanol (50 ml) is slowly added with stirring. The precipitated dye is filtered-off, washed with methanol and dried overnight in a desiccator to a fine black powder (3.0 g, 97%.). λ_max=(EtOAc) 565 nm (43,400), FWHM 142 nm. HPLC: 100% (550 nm).

Example 2

Preparation of 2,2'-(2-(-(4-Dioctylamino)-2-methylphenyl)-diazenyl)-5-((4-nitrophenyl)diazenyl)-1,4-phenylene)bis(oxy)bis(ethane-2.1-diyl) diacrylate (Dye 2)

Prepared by a 4 step procedure as detailed below:

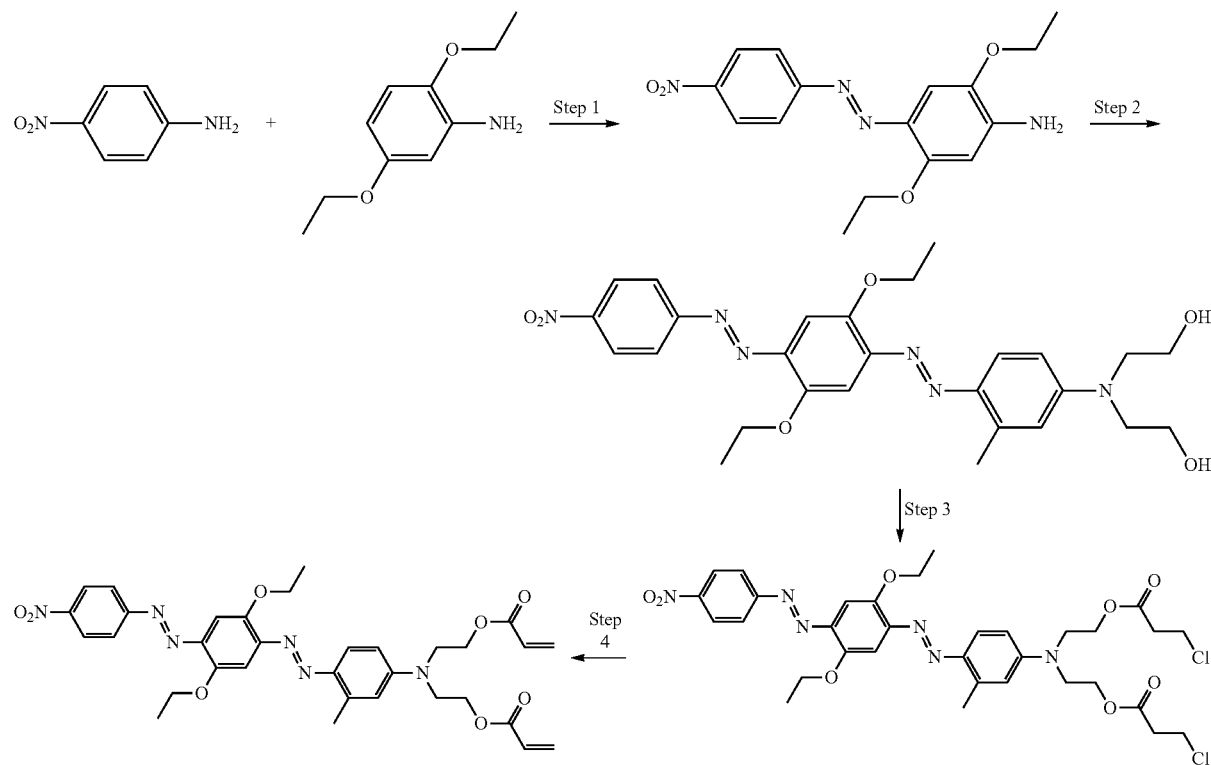

Step 1:
2,5-Diethoxy-4-((4-nitrophenyl)diazenyl)aniline

4-Nitroaniline (6.9 g, 0.05 mol) is suspended in water (150 ml) and 35% HCl (17.3 g) is added. To this is added a solution of sodium nitrite (3.6 g, 0.053 mol) at 0-5° C., pH<1. Once all solid has dissolved, excess nitrous acid is destroyed by addition of sulfamic acid and the solution is then added dropwise to a solution of 2,5-diethoxyaniline (9.4 g, 0.052 mol) in water (300 ml) and 35% HCl (6 g). The resultant suspension is stirred overnight, filtered-off, washed copiously with cold water, then crystallised from ethyl cellosolve (400 ml). The resulting solid is filtered-off, washed with IMS and dried to a fine red crystalline solid (15.4 g, 93%). Mp=218-220° C.

Step 2: 2,2'-(4-((2,5-diethoxy-4-((4-nitrophenyl)diazenyl)phenyl)-diazenyl)-3-methylphenylazanediyl) diethanol 2,5-Diethoxy-4-((4-nitrophenyl)diazenyl)aniline (3.3 g, 10 mmol) is stirred in NMP (45 ml) and warmed to 60° C. to dissolve. The solution is then cooled with stirring to 5° C., giving a thick fine precipitate. Nitrosylsulfuric acid (40% w/w) (3.2 g, 10 mmol) is added. The solution is stirred for a further 2 hours at room temperature. N,N-dihydroxyethyl-m-toluidine (1.95 g, 10 mmol) and sulfamic acid (0.5 g) are dissolved in a mixture of butanol/water, and the prepared diazonium salt solution is then added. The mixture is stirred overnight, allowing it to warm to room temperature. The black solid is filtered-off and dried (4.6 g, 85%). The solid is purified further by dissolution in ethyl cellosolve (200 ml) at 100° C., followed by dropwise addition of water (100 ml). On cooling, a precipitate is formed, which is filtered-off, washed with water, IMS and dried to give a fine blue-black solid (2.9 g, 54%).

Step 3: 2,2'-(4-((2,5-diethoxy-4-((4-nitrophenyl)diazenyl)phenyl)-diazenyl)-3-methylphenylazanediyl)bis(ethane-2,1-diyl)bis(3-chloropropanoate)

2,2'-(4-((2,5-Diethoxy-4-((4-nitrophenyl)diazenyl)phenyl)diazenyl)-3-methylphenylazanediyl)diethanol (2.9 g, 5.4 mmol) and $K_2CO_3$ (2.8 g, 20 mmol) are suspended in THF (85 ml) and 3-chloropropionyl chloride (2.5 g, 20 mmol) is added. After stirring at ambient temperature for 24 hours, water (5 ml) is added, stirring continues for 30 minutes. The residue is dissolved in methylene chloride and filtered through a small pad of silica gel. The filtrate is evaporated and the residue is crystallised from a mixture of methylene chloride and IMS. The resultant black crystals are filtered-off, washed with IMS and dried (1.6 g, 41%). A second crop of tarry black crystals are isolated (1.7 g, 44%).

Step 4: 2,2'-(4-((2,5-diethoxy-4-((4-nitrophenyl)diazenyl)phenyl)-diazenyl)-3-methylphenylazanediyl)bis(ethane-2,1-diyl) diacrylate (Dye 2)

2,2'-(4-((2,5-Diethoxy-4-((4-nitrophenyl)diazenyl)phenyl)diazenyl)-3-methylphenylazanediyl)bis(ethane-2,1-diyl)bis(3-chloropropanoate) (3.3 g, 4.6 mmol) is dissolved in methylene chloride (40 ml) and triethylamine (1.0 g, 10.1 mmol) is added. Methanol (50 ml) is slowly added with stirring and the product is crystallised from solution (2.4 g, 81%).

The crude material is purified over silica gel, eluting with toluene/methylene chloride. Fractions enriched with the required product are pooled, evaporated and dried in a vacuum desiccator (0.87 g, 29%). The material contains <3 mol % impurity by $^1$H NMR. $\lambda_{max}$ (EtOAc) 544 nm (35,500), half bandwidth 152 nm (605-453 nm).

Example 3

Preparation of (Dye 3)

Prepared by a 7 step procedure as detailed below

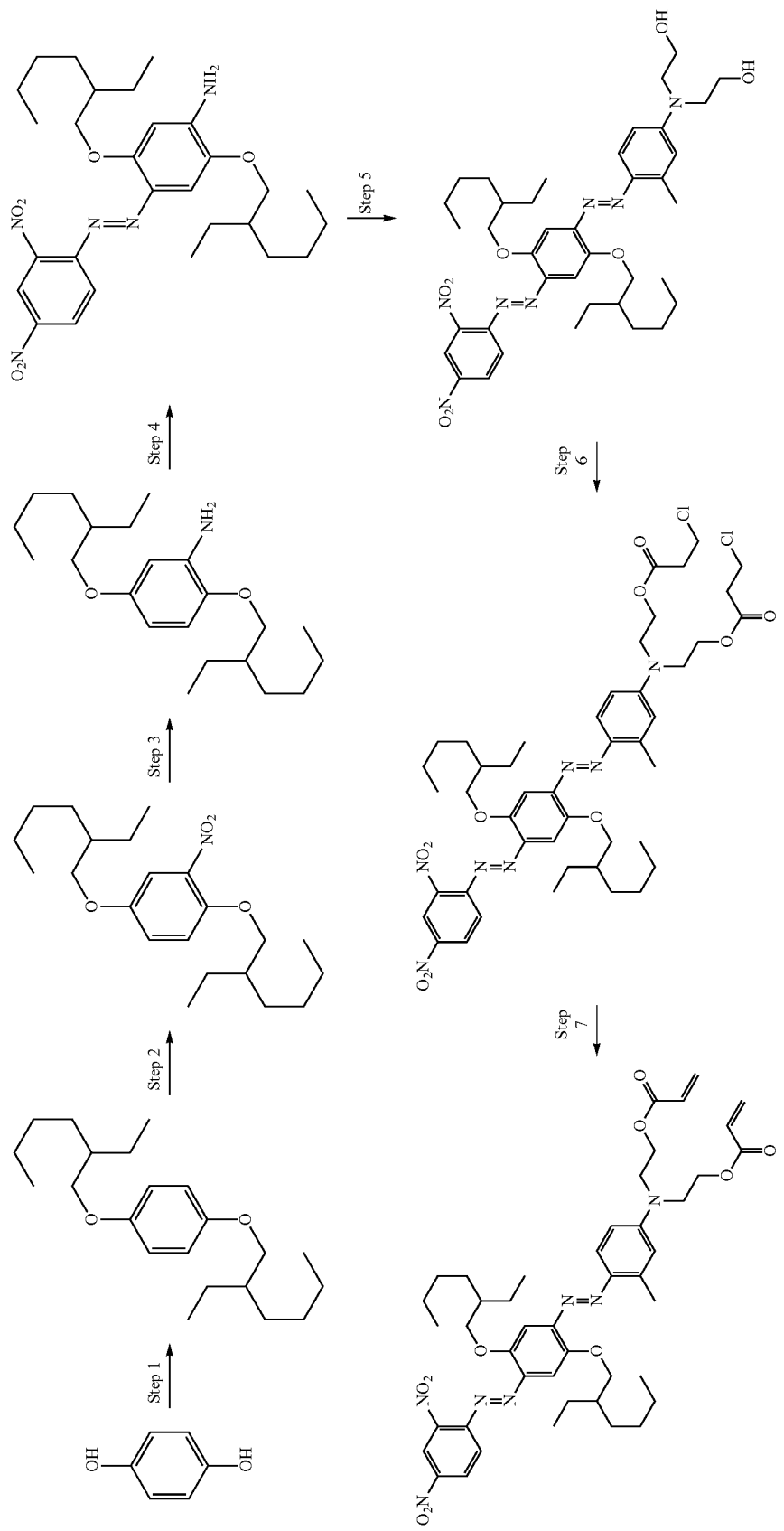

Step 1: 1,4-Bis(2-ethylhexyloxy)benzene

Hydroquinone (37.9 g, 0.344 mol) is suspended in IMS (310 ml) and 1-bromo-2-ethylhexane (132.7 g, 0.687 mol) is added. A solution of KOH (49.9 g, 0.89 mol) in IMS (250 ml) is added slowly over 1 minute. The mixture is heated at reflux whilst monitoring reaction progress by HPLC. After 16 hours, further 1-bromo-2-ethylhexane (53.1 g, 0.27 mol) and solid KOH (20.0 g, 0.36 mol) are added then heated for 2 hours at reflux. The reaction mixture is allowed to cool, is poured into water (1.5 L) and extracted with toluene (500 ml). The organic layer is dried over $MgSO_4$ then evaporated to yield a pale yellow oil. The oil is flashed through silica gel, eluting with 50/50 dichloromethane/hexane to give two product fractions. The initial fraction (35.3 g) co-eluted with 2-ethylhexan-1-ol by-product. The second fraction is evaporated to give pure 1,4-bis(2-ethylhexyloxy)benzene as a pale yellow oil (48.4 g, 42%). The initial fraction is further purified by bulb to bulb distillation to give further pure 1,4-bis(2-ethylhexyloxy)benzene as a pale yellow oil (25.3 g, 22%).

Step 2: 1,4-Bis(2-ethylhexyloxy)-2-nitrobenzene 1,4-Bis(2-ethylhexyloxy)benzene (50.2 g, 0.150 mol) is dissolved in chloroform (150 ml) and cooled to 0° C. Nitric acid (70%, 17.0 g, 0.190 mol) is added dropwise at 0-3° C. and the reaction stirred whilst monitoring progress by HPLC. After 60 minutes, water (50 ml) is added and the organic layer separated, dried ($MgSO_4$) and evaporated to give the title compound as a yellow oil (56.9 g, 100%). The material is used without further purification.

Step 3: 2,5-Bis(2-ethylhexyloxy)aniline 1,4-Bis(2-ethylhexyloxy)-2-nitrobenzene (11.4 g, 0.03 mol) is dissolved in 2-propanol (100 ml) and degassed under vacuum, purging to nitrogen. 10% (w/w) Pd/C (0.52 g) is added and the mixture heated to 80° C. Water (10 ml) is added, followed by solid ammonium formate (18.9 g, 0.3 mol). After a further 1 hour at 80° C., the reaction mixture is allowed to cool then filtered to remove catalyst, to give a colourless solution which darkened rapidly on standing. The material is used immediately as an isopropanol solution (quant).

Step 4: 4-((2,4-Dinitrophenyl)diazenyl)-2,5-bis(2-ethylhexyloxy)aniline 2,4-Dinitroaniline (3.7 g, 0.02 mol) is suspended in a mixture of acetic acid (20 ml) and propionic acid (10 ml) and cooled to 3° C. 40% (w/w) nitrosyl sulfuric acid in sulfuric acid (6.4 g, 0.02 mol) is added dropwise and stirring continued for 30 minutes to give a pale yellow solution. Crude 2,5-bis(2-ethylhexyloxy)aniline (0.02 mol) solution is diluted with IMS (200 ml) and 10% sulfamic acid solution (20 ml) added, followed by ice (200 g). The above pale yellow diazonium salt solution is slowly added with stirring and a dark oil rapidly separated. The mixture is stirred overnight and the water is decanted off. The crude product (8.3 g) is dissolved in 25/75 dichloromethane/hexane and purified over silica gel, the required product eluting with 50/50 hexane/dichloromethane. Evaporation and trituration with methanol gave 4-((2,4-dinitrophenyl)diazenyl)-2,5-bis(2-ethylhexyloxy)-aniline as a violet-blue crystalline solid (4.2 g, 39%).

Step 5: 2,2'-(4-((E)-(4-((E)-(2,4-Dinitrophenyl)diazenyl)-2,5-bis(2-ethylhexyloxy)phenyl)diazenyl)-3-methylphenylazanediyl)diethanol 4-((2,4-Dinitrophenyl)diazenyl)-2,5-bis(2-ethylhexyloxy) aniline (0.54 g, 1 mmol) is dissolved in NMP (10 ml) and to this is added 40% (w/w) nitrosyl sulfuric acid in sulfuric acid (0.38 g, 1.2 mmol). After 30 minutes, the mixture is added to a solution of 2,2'-(m-tolylazanediyl)diethanol (0.20 g, 1 mmol) and sulfamic acid (0.5 g) in IMS (100 ml). A dark oily solid separates immediately. After stirring overnight, the aqueous supernatant is decanted off, the oily solid washed with further water, then dried at 40° C. The pure title compound is acquired as a blue-black solid after multiple purifications over silica gel, eluting with dichloromethane containing an increasing concentration of ethyl acetate (0.54 g, 72%).

Step 6: 2,2'-(4-((E)-(4-((E)-(2,4-dinitrophenyl)diazenyl)-2,5-bis(2-ethylhexyloxy)phenyl)diazenyl)-3-methylphenylazanediyl)bis(ethane-2,1-diyl)bis(3-chloropropanoate)

2,2'-(4-((E)-(4-((E)-(2,4-Dinitrophenyl)diazenyl)-2,5-bis (2-ethylhexyloxy)phenyl)diazenyl)-3-methylphenylazanediyl)diethanol (3.5 g, 5 mmol) is dissolved in dichloromethane (50 ml) and sodium bicarbonate (12.6 g, 0.15 mol) is added with stirring to suspend. 3-Chloropropionyl chloride (1.9 g, 15 mmol) is added and the mixture heated at 40° C. (bath temp.) overnight. The inorganics are filtered off, the dichloromethane is evaporated and the product solidified by adding IMS. A 2.7 g sample of crude product is taken through directly to the next step without further purification. A 1 g sample of material is recrystallised from IMS to obtain a pure sample as a violet/black crystalline solid; m.p 123-125° C., $\lambda_{max}$ (EtOAc) 573 nm (40,000), half bandwidth 160 nm, 353 nm (13,500).

Step 7: 2,2'-(4-((E)-(4-((E)-(2,4-dinitrophenyl)diazenyl)-2,5-bis(2-ethylhexyloxy)phenyl)diazenyl)-3-methylphenylazanediyl)bis(ethane-2,1-diyl) diacrylate Crude 2,2'-(4-((E)-(4-((E)-(2,4-dinitrophenyl)diazenyl)-2, 5-bis(2-ethylhexyloxy)phenyl)diazenyl)-3-methylphenylazanediyl)bis(ethane-2,1-diyl)bis(3-chloropropanoate) (2.7 g, 2.9 mmol) is dissolved in dichloromethane (50 ml) and triethylamine (0.9 g, 8.7 mmol) is added. The mixture is heated at 30° C. (bath temp.) overnight and the product precipitated by adding IMS. The solid is recrystallised from hot IMS and the title compound is isolated as a violet/black powder; m.p 128-130° C., $\lambda_{max}$ (EtOAc) 574 nm (40,000), half bandwidth 160 nm, 354 nm (13,500).

Examples 4-6

Preparation of Black Polymer Particles

Example 4

Preparation of Dyed Polymer Particles Incorporating Black Polymerisable Dyes at 5 Weight % Based on Methyl Methacrylate by Dispersion Polymerisation and Exemplified for the Black Polymerisable Dye 1 of Example 1

NAD stabiliser 30% by weight in dodecane is obtained from ICI Ltd. precipitated in cold methanol, dried and dissolved in a 50:50 mixture of ethyl acetate (Aldrich) and butyl acetate (Aldrich). All materials other than dyes are commercially available.

Methyl methacrylate (20.58 g), NAD stabiliser (3.50 g) and methacrylic acid (0.42 ml) are weighed out into a 100 ml 3-necked flask equipped with a condenser, nitrogen flow, and an overhead stirrer. Dye 1 (1.029 g, 5 weight %) is added and stirred for 1 minute to facilitate dissolution of the dye. Dodecane (25.20 g) is added to the reaction flask, followed by 1-octanethiol (0.125 ml). The mixture is heated with stirring at 300 rpm, once the temperature in the flask is at 75° C., Vazo 67 (0.20 g) is added and the reaction is stirred for 2 hours.

The resulting solution is filtered through 50 micron cloth to remove small lumps. The particles are cleaned using a centrifuge. Centrifugations are carried out at 10 000 rpm for 40 minutes each, replacing the supernatant with dodecane, this is repeated until the supernatant is colourless. Average particle size is measured by SEM and image analysis: 234 nm.

Table 2 shows similarly prepared polymer particles containing the following dyes (the weight % of dyes based on methyl methacrylate; size measured by SEM):

TABLE 2

| Experiment No | Dye Name | Dye % | Size/nm |
|---|---|---|---|
| 4 | Dye 1 | 5 | 234 |
| 5 | Dye 2 | 5 | 169 |
| 6 | Dye 3 | 5 | 547 |

Example 7

Preparation of an Electrophoretic Formulation Containing a Dispersion of Black Coloured Particles The electrophoretic ink is prepared by vortex mixing 0.0981 g of particles of Example 4 comprising Dye 1, 0.0978 g of AOT (Sigma Aldrich), and 1.8585 g of dodecane (Sigma Aldrich). The dispersion is then roller mixed for 30 minutes.

Electrophoretic Mobility (−0.04746 µmcm/Vs), ZP (−51.2 mV)

Example 8

Preparation of an Electrophoretic Formulation Containing a Dispersion of Black Coloured Particles The electrophoretic ink is prepared by vortex mixing 0.1330 g of particles of Example 4 comprising Dye 3 (53.1% solids content), 1.4097 g of AOT (5 wt % AOT in dodecane), and 0.8225 g of dodecane. The dispersion is then roller mixed for 30 minutes.

Electrophoretic Mobility (−0.0745 µmcm/Vs), ZP (−80.3 mV)

Example 9

Preparation of an Electrophoretic Formulation Containing a Dispensation of Black Coloured Particles The electrophoretic ink is prepared by vortex mixing 0.1209 g of particles of Example 4 comprising Dye 3 (53.1% solids content), 1.2835 g of Span 85 (5 wt % Span 85 in dodecane), and 0.7356 g of dodecane. The dispersion is then roller mixed for 30 minutes.

Electrophoretic Mobility (0.05675 µmcm/Vs), ZP (61.2 mV)

The invention claimed is:

1. Polymer particles for use in electrophoretic devices comprising monomer units of a) at least one polymerisable dye, b) at least one monomer, c) optionally at least one charged co-monomer, and d) optionally at least one crosslinking co-monomer, wherein dyes of Formula (1) are used

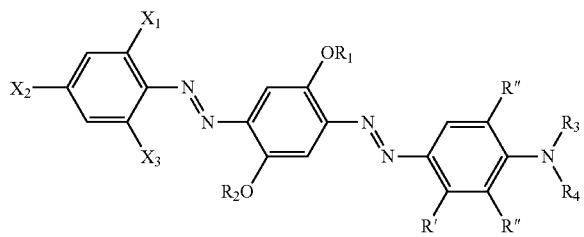

Formula (1)

wherein
  $X_1$, $X_2$, and $X_3$ are, independently of one another, H or an electron-withdrawing group;
  $R_1$ and $R_2$ are, independently of one another, groups of the structure $L_1$-$Y_1$, $L_2$-$Y_2$, or linear, branched, or cyclic alkyl groups;
  $R_3$ and $R_4$ are, independently of one another, groups of the structure $L_3$-$Y_3$, $L_4$-$Y_4$, or linear, branched, or cyclic, substituted or unsubstituted alkyl groups, where one or more non-adjacent carbon atoms are optionally replaced by O, S, and/or N;
  $L_1$, $L_2$, $L_3$, and $L_4$ are, independently of one another, linear or branched, substituted or unsubstituted alkylene groups, where one or more non-adjacent carbon atoms are optionally replaced by O, S, and/or N;
  $Y_1$, $Y_2$, $Y_3$, and $Y_4$ are, independently of one another, polymerisable groups;
  R' is a linear or branched alkyl group, $OR_5$, H, $NHCOR_6$, or $NHSO_2R_7$;
  R" is $OR_5$, H, or $NHCOR_6$,
  $R_5$, $R_6$, and $R_7$ are, independently of one another, linear or branched alkyl groups; and
wherein at least one of $R_1$, $R_2$, $R_3$, and $R_4$, is a polymerisable group and at least one of $X_1$, $X_2$, and $X_3$, is an electron-withdrawing group.

2. The polymer particles of claim 1, wherein at least two of $Y_1$, $Y_2$, $Y_3$, and $Y_4$, are polymerisable groups selected from acrylate and methacrylate groups.

3. The polymer particles of claim 1, wherein $X_2$ is, or $X_2$ and one of $X_1$ and $X_3$ are, $NO_2$, CN, Br, Cl, $SO_2NRR$, or $SO_2NHR$, wherein R is C1-C4 alkyl.

4. The polymer particles of claim 1, wherein groups $R_1$, $R_2$ $R_3$, and $R_4$, are independently of one another, linear, branched, or cyclic alkyl groups having 1 to 10 C atoms.

5. The polymer particles of claim 1, wherein in groups $L_1$-$Y_1$, $L_2$-$Y_2$, $L_3$-$Y_3$, or $L_4$-$Y_4$, $L_1$, $L_2$, $L_3$, and $L_4$, denote independently of one another linear or branched alkylene groups having 1 to 10 C atoms and $Y_1$, $Y_2$, $Y_3$, and $Y_4$, denote independently of one another methacrylate or acrylate.

6. The polymer particles of claim 1, wherein R' is $CH_3$ or $OCH_3$ and R" is H.

7. The polymer particles of claim 1, wherein at least one dye of Formulae (2) to (5) is used

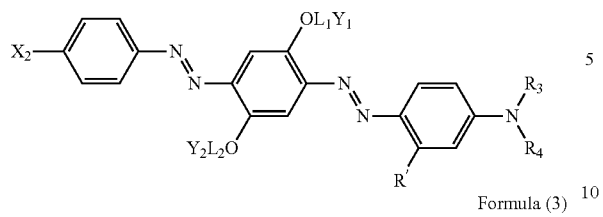
Formula (2)

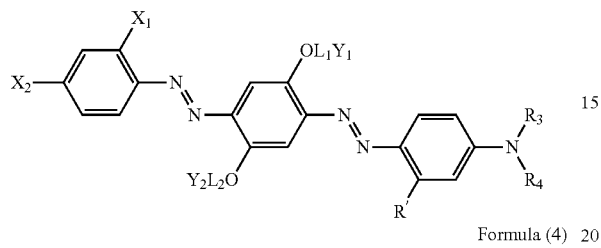
Formula (3)

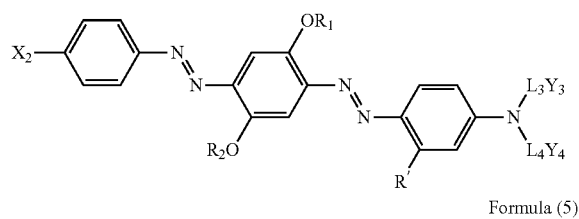
Formula (4)

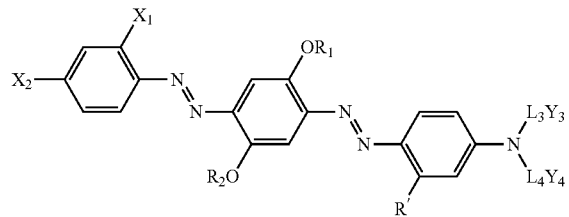
Formula (5)

wherein
$X_1$ is $NO_2$ or CN;
$X_2$ is $NO_2$, CN, or halogen;
$L_1$, $L_2$, $L_3$, and $L_4$ is C2-C10 alkylene;
$Y_1$, $Y_2$, $Y_3$, and $Y_4$ is methacrylate or acrylate;
$R_1$, $R_2$, $R_3$, and $R_4$ is C2-C10 alkyl, and
R' is $CH_3$ or $OCH_3$.

8. The polymer particles of claim 1, wherein at least one black polymerisable dye is used.

9. The polymer particles of claim 1, wherein the polymer particles have a diameter of 100-1000 nm.

10. A process for the preparation of the polymer particles of claim 1, comprising
 a) the polymerisation of at least one polymerisable dye, at least one monomer, at least one initiator, and optionally at least one charged co-monomer by dispersion polymerisation in at least one non-aqueous, non-polar solvent, and optionally
 b) washing and drying the polymer particles.

11. A mono, bi, or polychromal, electrophoretic device comprising the polymer particles of claim 1.

12. An electrophoretic fluid comprising the polymer particles of claim 1.

13. An electrophoretic display device comprising the electrophoretic fluid of claim 12.

14. The electrophoretic display device of claim 13, wherein the electrophoretic fluid is applied by a technique selected from inkjet printing, slot die spraying, nozzle spraying, and flexographic printing, or any other contact or contactless printing or deposition technique.

15. The polymer particles of claim 1, wherein the polymer particles have a diameter of 150-600 nm.

16. Polymerisable dyes of Formula (1)

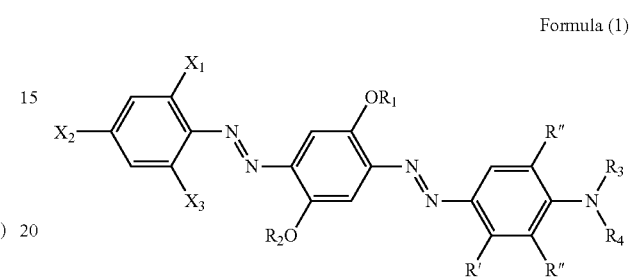
Formula (1)

wherein
 $X_1$, $X_2$, and $X_3$ are, independently of one another, H or an electron-withdrawing group;
 $R_1$ and $R_2$ are, independently of one another, groups of the structure $L_1$-$Y_1$, $L_2$-$Y_2$, or linear, branched, or cyclic alkyl groups;
 $R_3$ and $R_4$ are, independently of one another, groups of the structure $L_3$-$Y_3$, $L_4$-$Y_4$, or linear, branched, or cyclic, substituted or unsubstituted alkyl groups, where one or more non-adjacent carbon atoms are optionally replaced by O, S, and/or N;
 $L_1$, $L_2$, $L_3$, and $L_4$ are, independently of one another, linear or branched, substituted or unsubstituted alkylene groups, where one or more non-adjacent carbon atoms are optionally replaced by O, S, and/or N;
 $Y_1$, $Y_2$, $Y_3$, and $Y_4$ are, independently of one another, polymerisable groups;
 R' is a linear or branched alkyl group, $OR_5$, H, $NHCOR_6$, or $NHSO_2R_7$;
 R" is $OR_5$, H, or $NHCOR_6$,
 $R_5$, $R_6$, and $R_7$ are, independently of one another, linear or branched alkyl groups; and
wherein at least one of $R_1$, $R_2$, $R_3$, and $R_4$, is a polymerisable group and at least one of $X_1$, $X_2$, and $X_3$, is an electron-withdrawing group.

17. The polymerisable dyes of claim 16 wherein the dyes correspond to Formulae (2) to (5)

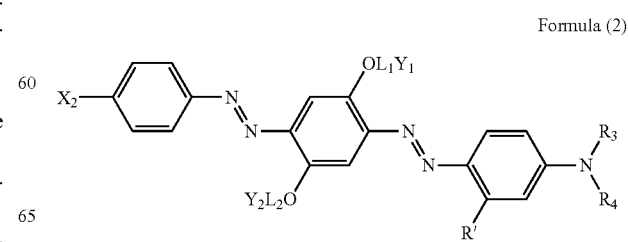
Formula (2)

Formula (3)
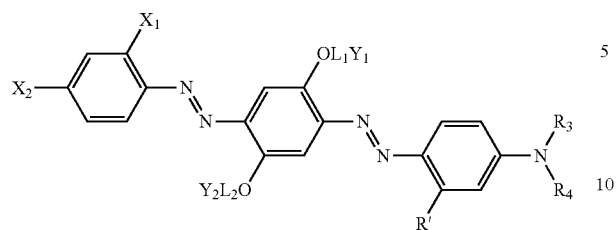
Formula (4)
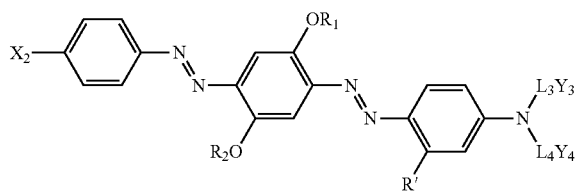
Formula (5)
[structure shown]
wherein
 $X_1$ is $NO_2$ or CN;
 $X_2$ is $NO_2$, CN, or halogen;
 $L_1$, $L_2$, $L_3$, and $L_4$ is C2-C10 alkylene;
 $Y_1$, $Y_2$, $Y_3$, and $Y_4$ is methacrylate or acrylate;
 $R_1$, $R_2$, $R_3$, and $R_4$ is C2-C10 alkyl, and
 R' is $CH_3$ or $OCH_3$.
18. An electrophoretic device comprising polymer particles comprising the polymerisable dyes of claim 16.
* * * * *